(12) United States Patent
Carpenter et al.

(10) Patent No.: US 10,612,213 B2
(45) Date of Patent: Apr. 7, 2020

(54) MONITORING GROUND-ENGAGING PRODUCTS FOR EARTH WORKING EQUIPMENT

(71) Applicant: ESCO Corporation, Portland, OR (US)

(72) Inventors: Christopher M. Carpenter, Tualatin, OR (US); Steven D. Hyde, Portland, OR (US); Javier Lander, Madrid (ES); Jason W. Betournay, Portland, OR (US); Karsten D. Zuendel, Portland, OR (US)

(73) Assignee: ESCO GROUP LLC, Portland, OR (US)

( * ) Notice: Subject to any disclaimer, the term of this patent is extended or adjusted under 35 U.S.C. 154(b) by 0 days.

(21) Appl. No.: 16/015,108

(22) Filed: Jun. 21, 2018

(65) Prior Publication Data

US 2018/0298588 A1    Oct. 18, 2018

Related U.S. Application Data

(62) Division of application No. 15/043,482, filed on Feb. 12, 2016, now Pat. No. 10,011,975.

(60) Provisional application No. 62/116,216, filed on Feb. 13, 2015, provisional application No. 62/151,124, filed on Apr. 22, 2015, provisional application No. 62/175,109, filed on Jun. 12, 2015, provisional application No. 62/198,552, filed on Jul. 29, 2015, (Continued)

(51) Int. Cl.
*E02F 9/26* (2006.01)
*E02F 9/28* (2006.01)
*B64C 39/02* (2006.01)

(52) U.S. Cl.
CPC ............... *E02F 9/26* (2013.01); *E02F 9/267* (2013.01); *E02F 9/2825* (2013.01); *E02F 9/2833* (2013.01); *E02F 9/2841* (2013.01); *B64C 39/024* (2013.01); *B64C 2201/123* (2013.01)

(58) Field of Classification Search
CPC . E02F 9/26; E02F 9/267; E02F 9/2825; E02F 9/2833; E02F 9/2841; B64C 2201/123; B64C 39/024
See application file for complete search history.

(56) References Cited

U.S. PATENT DOCUMENTS

| | | |
|---|---|---|
| 561,758 A | 6/1896 | Brewer |
| 4,001,798 A | 1/1977 | Robinson |
| 4,181,360 A | 1/1980 | Wilson |

(Continued)

FOREIGN PATENT DOCUMENTS

| | | |
|---|---|---|
| AU | 2009200658 A1 | 9/2009 |
| AU | 2012215112 | 8/2013 |

(Continued)

OTHER PUBLICATIONS

D4: AU201426221 Opposition, Netarus, LLC, "HoistCam", https://www.youtube.com/watch?v=GkIHymxZpX8m, Oct. 2, 2013.

(Continued)

*Primary Examiner* — Tyler J Lee
(74) *Attorney, Agent, or Firm* — Steven P. Schad; Palmer Dzurella

(57) ABSTRACT

A product and system for identifying and monitoring a characteristic including the part ID, presence, condition, usage and/or performance of ground-engaging products used on various kinds of earth working equipment.

30 Claims, 22 Drawing Sheets

Related U.S. Application Data provisional application No. 62/234,463, filed on Sep. 29, 2015.

(56) References Cited

U.S. PATENT DOCUMENTS

| | | | |
|---|---|---|---|
| 4,187,626 A | 2/1980 | Greer et al. | |
| 4,368,919 A | 1/1983 | Whittaker et al. | |
| 4,399,554 A | 8/1983 | Perkins, III et al. | |
| 4,407,081 A | 10/1983 | Hanson | |
| 4,499,960 A | 2/1985 | Ehrich | |
| 4,550,512 A | 11/1985 | Felstet | |
| 4,604,604 A | 8/1986 | Mann | |
| 4,627,013 A | 12/1986 | Ichiyama et al. | |
| 4,655,082 A | 4/1987 | Peterson | |
| 4,700,224 A | 10/1987 | Miyasaka et al. | |
| 4,709,265 A | 11/1987 | Silverman et al. | |
| 4,809,794 A | 3/1989 | Blair et al. | |
| 4,818,990 A | 4/1989 | Fernandes | |
| 4,845,763 A | 7/1989 | Bandyopadhyay et al. | |
| 4,932,145 A | 6/1990 | Reeves, Jr. | |
| 5,092,657 A | 3/1992 | Bryan, Jr. | |
| 5,144,762 A | 9/1992 | Robinson | |
| 5,401,115 A | 3/1995 | Musil et al. | |
| 5,555,652 A | 9/1996 | Ashby | |
| 5,701,179 A | 12/1997 | Chatterjee | |
| 5,743,031 A * | 4/1998 | Launder | E02F 9/2808 |
| | | | 116/214 |
| 5,824,965 A | 10/1998 | Fujii et al. | |
| 5,850,341 A | 12/1998 | Fournier et al. | |
| 5,871,391 A | 2/1999 | Pryor | |
| 5,926,558 A | 7/1999 | Zelt, III et al. | |
| 5,937,550 A | 8/1999 | Emrich | |
| 6,032,390 A | 3/2000 | Bierwith | |
| 6,360,850 B1 | 3/2002 | Odisho | |
| 6,363,173 B1 | 3/2002 | Stentz et al. | |
| 6,408,258 B1 | 6/2002 | Richer | |
| 6,457,268 B1 * | 10/2002 | Perry | E02F 3/8152 |
| | | | 37/403 |
| 6,470,606 B1 | 10/2002 | Nagahiro et al. | |
| 6,497,153 B1 | 12/2002 | Hoskinson et al. | |
| 6,518,519 B1 | 2/2003 | Crane, III et al. | |
| 6,523,586 B1 | 2/2003 | Eromaeki et al. | |
| 6,868,314 B1 | 3/2005 | Frink | |
| 6,870,485 B2 * | 3/2005 | Lujan | E02F 9/24 |
| | | | 340/480 |
| 6,907,384 B2 | 6/2005 | Adachi et al. | |
| 6,957,622 B2 | 10/2005 | Boettcher et al. | |
| 6,990,390 B2 * | 1/2006 | Groth | E02F 3/435 |
| | | | 37/413 |
| 7,223,062 B1 | 5/2007 | Emerson | |
| 7,248,154 B2 | 7/2007 | Menke | |
| 7,422,391 B2 | 9/2008 | Holl et al. | |
| 7,509,638 B2 | 3/2009 | Backhouse et al. | |
| 7,574,821 B2 | 8/2009 | Furem | |
| 7,579,952 B2 | 8/2009 | Osterhold | |
| 7,631,560 B2 | 12/2009 | Lund et al. | |
| 7,677,079 B2 | 3/2010 | Radziszewski et al. | |
| 7,695,071 B2 | 4/2010 | Jackson et al. | |
| 7,832,126 B2 | 11/2010 | Koellner et al. | |
| 7,836,615 B2 | 11/2010 | Winter | |
| 7,874,085 B1 | 1/2011 | Winter et al. | |
| 7,908,928 B2 | 3/2011 | Vik | |
| 7,912,612 B2 | 3/2011 | Janardhan et al. | |
| 7,930,844 B2 | 4/2011 | Quarfordt et al. | |
| 7,941,306 B2 | 5/2011 | Furem et al. | |
| 8,024,874 B2 | 9/2011 | McClanahan et al. | |
| 8,050,489 B2 | 11/2011 | Eberle et al. | |
| 8,087,477 B2 | 1/2012 | Sullivan et al. | |
| 8,150,105 B2 | 4/2012 | Mian et al. | |
| 8,190,335 B2 | 5/2012 | Vik et al. | |
| 8,240,070 B1 | 8/2012 | Phillips | |
| 8,284,096 B2 | 10/2012 | Martinez Godoy | |
| 8,306,797 B2 | 11/2012 | Furem et al. | |
| 8,315,802 B2 | 11/2012 | Brown | |
| 8,327,563 B2 | 12/2012 | Dingwall et al. | |
| 8,351,680 B2 | 1/2013 | Kalteis | |
| 8,386,196 B2 * | 2/2013 | Wagner | B28D 7/00 |
| | | | 702/34 |
| 8,405,721 B2 | 3/2013 | Bilandi et al. | |
| 8,406,963 B2 | 3/2013 | Farmer et al. | |
| 8,411,930 B2 * | 4/2013 | Ridley | G06T 7/0008 |
| | | | 382/152 |
| 8,437,921 B2 | 5/2013 | Paull | |
| 8,473,235 B2 | 6/2013 | Kittel et al. | |
| 8,504,255 B2 | 8/2013 | Colwell et al. | |
| 8,583,313 B2 | 11/2013 | Mian | |
| 8,738,304 B2 | 5/2014 | Hall et al. | |
| 8,738,342 B2 | 5/2014 | Lind et al. | |
| 8,775,099 B2 | 7/2014 | Wagner et al. | |
| 8,791,997 B2 | 7/2014 | Munkelt et al. | |
| 8,820,845 B2 | 9/2014 | Hall | |
| 8,843,279 B2 | 9/2014 | Tafazoli Bilandi et al. | |
| 8,872,643 B2 | 10/2014 | Ebert | |
| 8,872,818 B2 | 10/2014 | Freeman et al. | |
| 8,875,424 B2 | 11/2014 | Moller | |
| 8,890,672 B2 | 11/2014 | Miller | |
| 8,959,806 B2 | 2/2015 | Zamorano Jones | |
| 8,983,172 B2 | 3/2015 | Steffenson | |
| 8,990,672 B1 | 3/2015 | Grosz et al. | |
| 9,008,886 B2 | 4/2015 | Braunstein et al. | |
| 9,030,332 B2 | 5/2015 | Tafazoli Bilandi et al. | |
| 9,036,861 B2 | 5/2015 | Chen et al. | |
| 9,037,359 B2 | 5/2015 | Taylor et al. | |
| 9,145,741 B2 | 9/2015 | Trinh et al. | |
| 9,169,923 B2 | 10/2015 | Knisely | |
| 9,175,448 B2 | 11/2015 | Von Schoenebeck et al. | |
| 9,187,881 B2 * | 11/2015 | Bierwith | B23P 19/04 |
| 9,208,555 B1 | 12/2015 | Steiger et al. | |
| 9,222,243 B2 | 12/2015 | Cheyne et al. | |
| 9,234,422 B2 | 1/2016 | Hall | |
| 9,235,902 B2 | 1/2016 | Jahanshahi et al. | |
| 9,243,381 B2 * | 1/2016 | Behmlander | E02F 3/8152 |
| 9,249,558 B2 * | 2/2016 | Bierwith | E02F 9/2833 |
| 9,305,345 B2 | 4/2016 | Lim et al. | |
| 9,310,189 B2 | 4/2016 | Burgunder et al. | |
| 9,310,345 B2 | 4/2016 | Uchida | |
| 9,311,513 B2 | 4/2016 | Miller | |
| 9,355,346 B2 | 5/2016 | Butz | |
| 9,418,309 B2 | 8/2016 | Tafazoli Bilandi et al. | |
| 9,522,415 B2 | 12/2016 | Bamber et al. | |
| 9,670,649 B2 | 6/2017 | Bewley et al. | |
| 9,714,923 B2 * | 7/2017 | Behmlander | G01N 29/043 |
| 9,834,042 B2 | 12/2017 | Bogenschuetz | |
| 9,873,994 B2 | 1/2018 | Wagner et al. | |
| 10,008,095 B2 | 6/2018 | Reyes-Rodriguez et al. | |
| 10,190,289 B2 | 1/2019 | Reyes-Rodriguez et al. | |
| 2004/0227645 A1 | 11/2004 | Lujan et al. | |
| 2005/0021245 A1 * | 1/2005 | Furuno | E02F 9/205 |
| | | | 702/33 |
| 2006/0042734 A1 | 3/2006 | Turner et al. | |
| 2006/0243839 A9 | 11/2006 | Barscevicius et al. | |
| 2006/0265914 A1 | 11/2006 | Gudat | |
| 2007/0286474 A1 | 12/2007 | Dralle | |
| 2008/0047170 A1 | 2/2008 | Nichols | |
| 2010/0096455 A1 | 4/2010 | Binmore | |
| 2010/0103260 A1 | 4/2010 | Williams | |
| 2010/0215212 A1 | 8/2010 | Flakes, Jr. | |
| 2011/0162241 A1 | 7/2011 | Wangsness | |
| 2011/0309935 A1 | 12/2011 | Emmett et al. | |
| 2011/0313625 A1 | 12/2011 | Miller et al. | |
| 2011/0317909 A1 | 12/2011 | Jeyaraman et al. | |
| 2012/0043980 A1 | 2/2012 | Davies | |
| 2012/0098654 A1 | 4/2012 | Ebert | |
| 2012/0136630 A1 | 5/2012 | Murphy et al. | |
| 2012/0169876 A1 | 7/2012 | Reichert et al. | |
| 2012/0218411 A1 | 8/2012 | Wu et al. | |
| 2012/0262708 A1 | 10/2012 | Connolly | |
| 2012/0300059 A1 | 11/2012 | Stege | |
| 2013/0033164 A1 | 2/2013 | Shani | |
| 2013/0035875 A1 | 2/2013 | Hall et al. | |
| 2013/0082846 A1 | 4/2013 | McKinley | |
| 2013/0145660 A1 * | 6/2013 | Zamorano Jones | E02F 9/00 |
| | | | 37/460 |

(56) References Cited

U.S. PATENT DOCUMENTS

| | | | |
|---|---|---|---|
| 2013/0147633 A1 | 6/2013 | Sumrall et al. | |
| 2013/0174453 A1* | 7/2013 | Cheyne | E02F 9/2841 37/453 |
| 2013/0233964 A1 | 9/2013 | Woodworth et al. | |
| 2014/0105481 A1* | 4/2014 | Hasselbusch | G06T 7/0006 382/141 |
| 2014/0125804 A1 | 5/2014 | Dammers | |
| 2014/0168420 A1 | 6/2014 | Naderhirn et al. | |
| 2014/0212846 A1 | 7/2014 | Miller et al. | |
| 2014/0311762 A1* | 10/2014 | Behmlander | E02F 3/8152 172/430 |
| 2014/0327733 A1 | 11/2014 | Wagreich | |
| 2015/0013134 A1 | 1/2015 | Zenier et al. | |
| 2015/0085123 A1 | 3/2015 | Tafazoli Bilandi et al. | |
| 2015/0107075 A1 | 4/2015 | Clarke et al. | |
| 2015/0149027 A1 | 5/2015 | Paulsen et al. | |
| 2015/0192526 A1 | 7/2015 | Nissen et al. | |
| 2015/0317787 A1 | 11/2015 | Badawy et al. | |
| 2015/0322634 A1 | 11/2015 | Stock et al. | |
| 2015/0337522 A1 | 11/2015 | Diekevers et al. | |
| 2015/0371243 A1 | 12/2015 | Ramaswamy et al. | |
| 2016/0024757 A1* | 1/2016 | Nomura | E02F 3/435 414/687 |
| 2016/0178483 A1* | 6/2016 | Sidles | G01M 17/03 73/146 |
| 2016/0221618 A1 | 8/2016 | Sidles | |
| 2016/0299091 A1 | 10/2016 | Bamber et al. | |
| 2016/0376771 A1 | 12/2016 | Behmlander et al. | |
| 2017/0175363 A1 | 6/2017 | Clarke | |
| 2017/0254051 A1 | 9/2017 | Hassanein et al. | |
| 2019/0010680 A1 | 1/2019 | Hills et al. | |

FOREIGN PATENT DOCUMENTS

| | | |
|---|---|---|
| AU | 2013304355 | 12/2016 |
| CA | 2274543 | 6/1998 |
| CA | 2880927 | 2/2014 |
| CA | 2993410 | 2/2017 |
| CN | 2913706 | 6/2007 |
| CN | 204001039 | 12/2014 |
| EP | 1414002 | 4/2004 |
| EP | 2402740 | 1/2012 |
| EP | 2161375 | 7/2014 |
| EP | 2921995 | 9/2015 |
| FR | 2977681 | 1/2013 |
| GB | 1487939 | 10/1977 |
| JP | S62202131 | 9/1987 |
| JP | 9-72180 | 3/1997 |
| JP | 07-42201 | 2/2005 |
| JP | 2007-120110 | 5/2007 |
| KR | 20050018773 | 2/2005 |
| KR | 20160063454 | 6/2016 |
| KR | 101806488 | 12/2017 |
| RU | 2274543 | 2/2006 |
| RU | 107986 | 9/2011 |
| SU | 132140 | 11/1959 |
| SU | 174996 | 9/1965 |
| SU | 781281 | 11/1980 |
| SU | 1254308 | 8/1986 |
| WO | WO 2003/035989 | 5/2003 |
| WO | WO 2006/128258 | 12/2006 |
| WO | WO 2007/149295 | 12/2007 |
| WO | WO 2012/107484 | 8/2012 |
| WO | WO 2012/112587 | 8/2012 |
| WO | WO 2012/116408 | 9/2012 |
| WO | WO 2013/033164 | 3/2013 |
| WO | WO 2014/026742 | 2/2014 |
| WO | WO 2016/008059 | 1/2016 |
| WO | WO 2017/017289 | 2/2017 |
| WO | WO 2018/095536 | 5/2018 |

OTHER PUBLICATIONS

D5: AU201426221 Opposition, Vision Systems Design, Vision system detects missing shovel teeth, https://www.vision-systems.com/cameras-accessories/article/16739047/vision-sys.

D6: AU201426221 Opposition, MRO Magazine, "Can You Dig It?", https://www.mromagazine.com/2011/12/18/can-you-dig-it-advanced-shovel-monitoring-systems-reduce-downtime/, Decembe.

D7: AU201426221 Opposition, Canadian Mining Journal, Bucket Tooth Loss—Money-saving Canadian-made solution, http://www.canadianminingjournal.com/news/bucket-tooth-loss-mone.

Loadrite: On Board Weighing Systems for Escavators, www.loadrites.cales.com, pp. 1-6, (2012).

AU201426221 Opposition Declaration of Rodney Keith Clarke, Mar. 21, 2019.

AU201426221 Opposition Declaration of Hezekiah Russel Holland, Apr. 5, 2019.

AU201426221 Opposition Statement of Grounds and Particulars.

AU201426221 Opposition Statutory Declaration of Rebecca Dutkowski, Mar. 21, 2019.

AU201426221 Opposition: 1st Hillier Declaration in Support of Opposition Exhibits, Dec. 11, 2018.

AU201426221 Opposition: 1st Hillier Declaration in Support of Opposition, Dec. 11, 2018.

AU201426221 Opposition: 2nd Hillier Declaration in Support of Opposition Exhibits, Dec. 20, 2018.

AU201426221 Opposition: 2nd Hillier Declaration in Support of Opposition, Dec. 20, 2018.

AU201426221 Opposition: 3rd Hillier Declaration in Support of Opposition Exhibits, Jun. 10, 2019.

AU201426221 Opposition: 3rd Hillier Declaration in Support of Opposition, Jun. 10, 2019.

D12: AU201426221 Opposition, Luo Xiujuan et al Missing Tooth Detection with Laser Range Sensing, Proceedings of the 5th World Congress on Intelligent Control of Automation.

"Vision Sensors for the Detection of Rail Wear Zones on Train Cars", SICKINSIGHT, http://www.sickinsight-online.com/vision-sensors-for-the-detection-of-rail-wear-zones-on-trai.

Lim et al., "Tooth Guard: A Vision System for Detecting Missing Tooth in Rope Mine Shovel", https://jvbsoares.files.wordpress.com/2016/03/tooth_guard_wacv_2016.pdf.

PCT/2014/067198—Written Opinion dated Apr. 9, 2015.

PCT/US2016/017896—Written Opinion dated Aug. 24, 2017.

Riegl, "Mobile Laser Scanning", www.riegl.com, http://www.riegal.com/nc/products/mobile-scanning/, Oct. 2, 2014.

Stephen Se et al., "Stereo-Vision Based 3D Modeling and Localization for Unmanned Vehicles", Intl J. of Intelligent Control & Systems, vol. 13, No. 1, pp. 47-58, Mar. 2008.

Trimble, "Applications and Markets", www.trimble.com, http://uas.trimble.com/applicants-and-markets, Oct. 2, 2014.

Trimble, "Installation Instructions: Trimble Yield Monitoring System", www.trimble.com, Version 2.00, Revision A, Westminster, CO., Dec. 2012.

Trimble, "Trimble Loadrite X2350 Excavator Scales", www.trimble.com, Westminster, CO., 2013.

Trimble, "Yield Monitoring", www.trimble.com, http://www.trimble.com/Agriculture/yield-monitoring.aspx, Nov. 7, 2014.

* cited by examiner

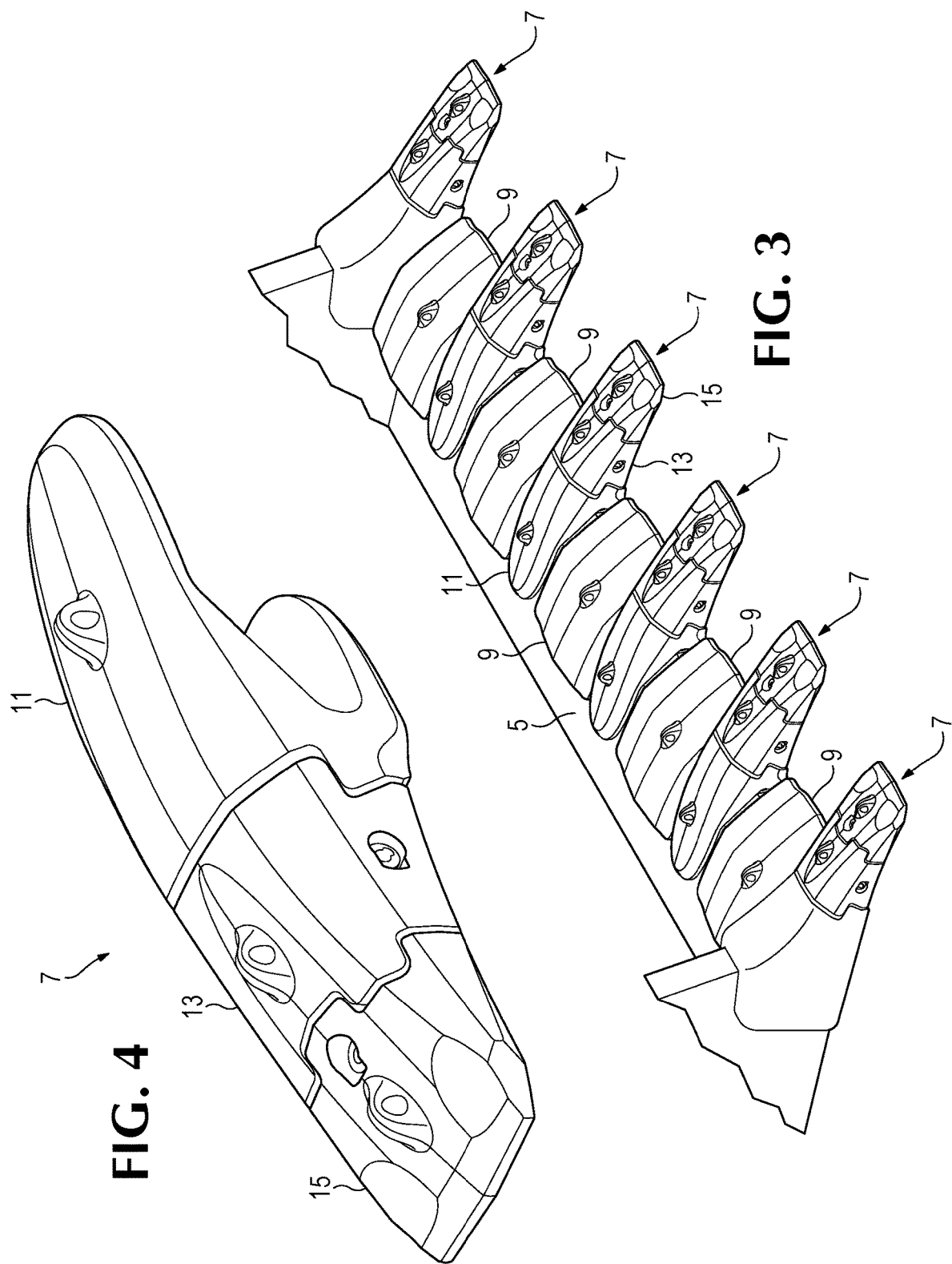

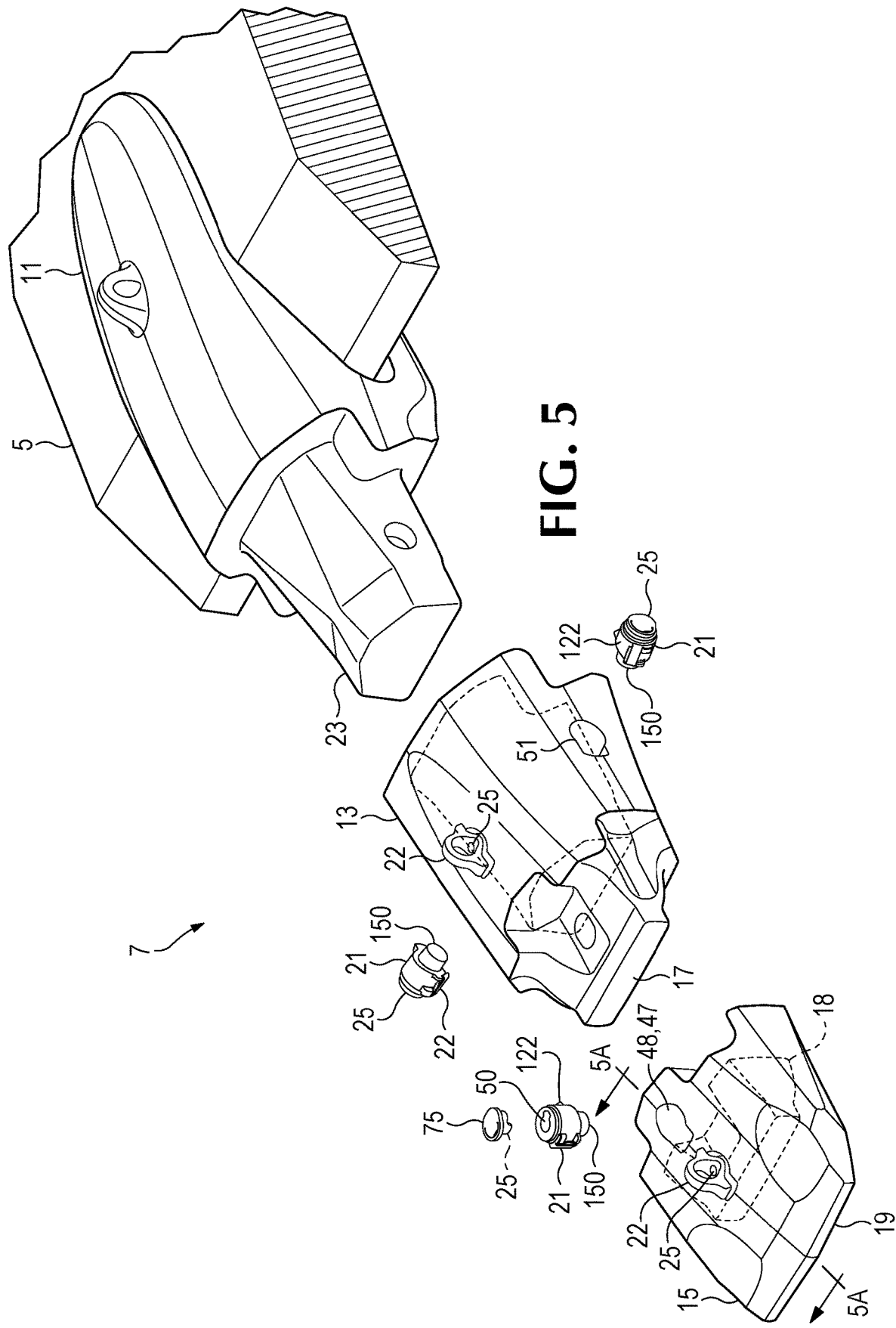

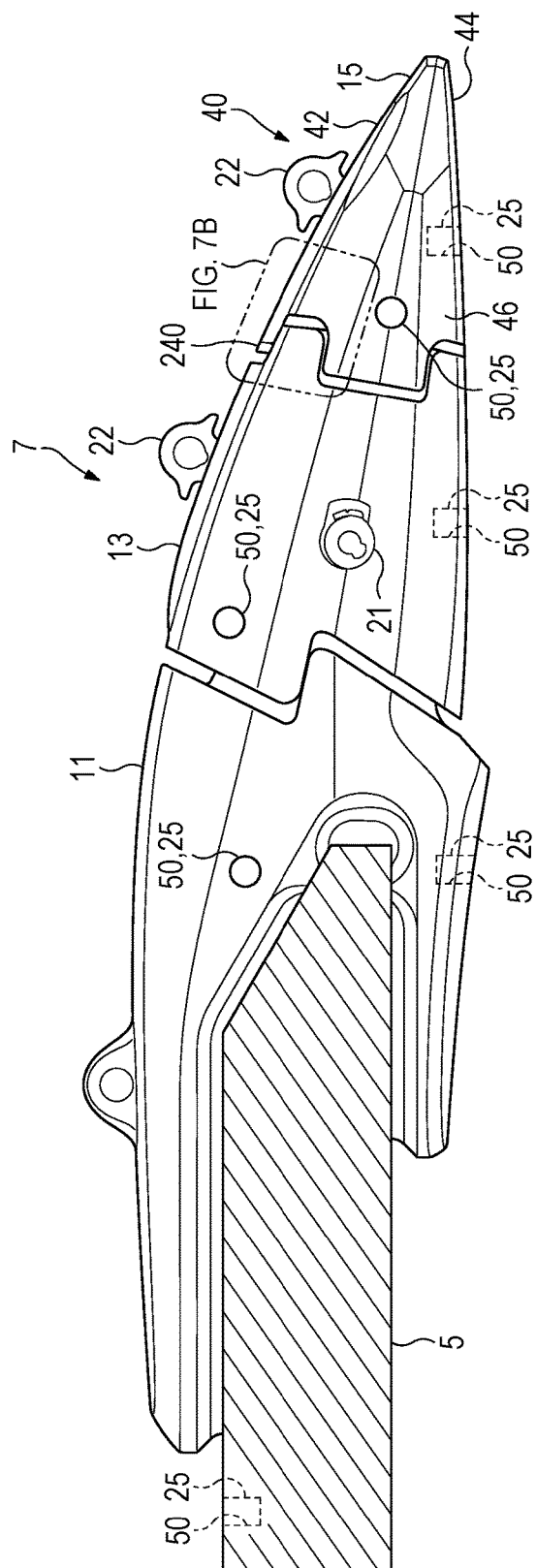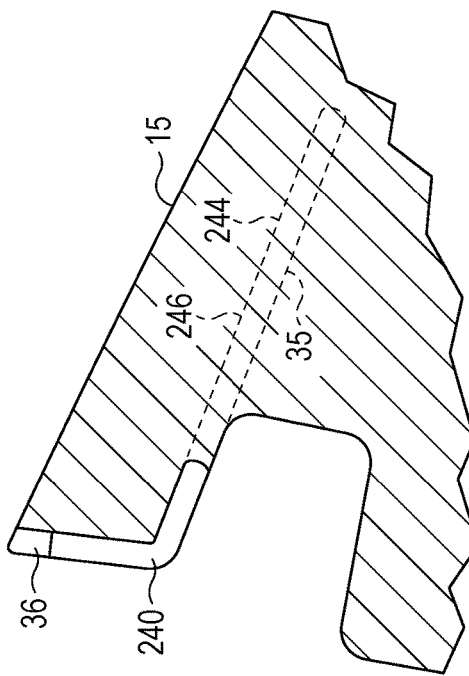

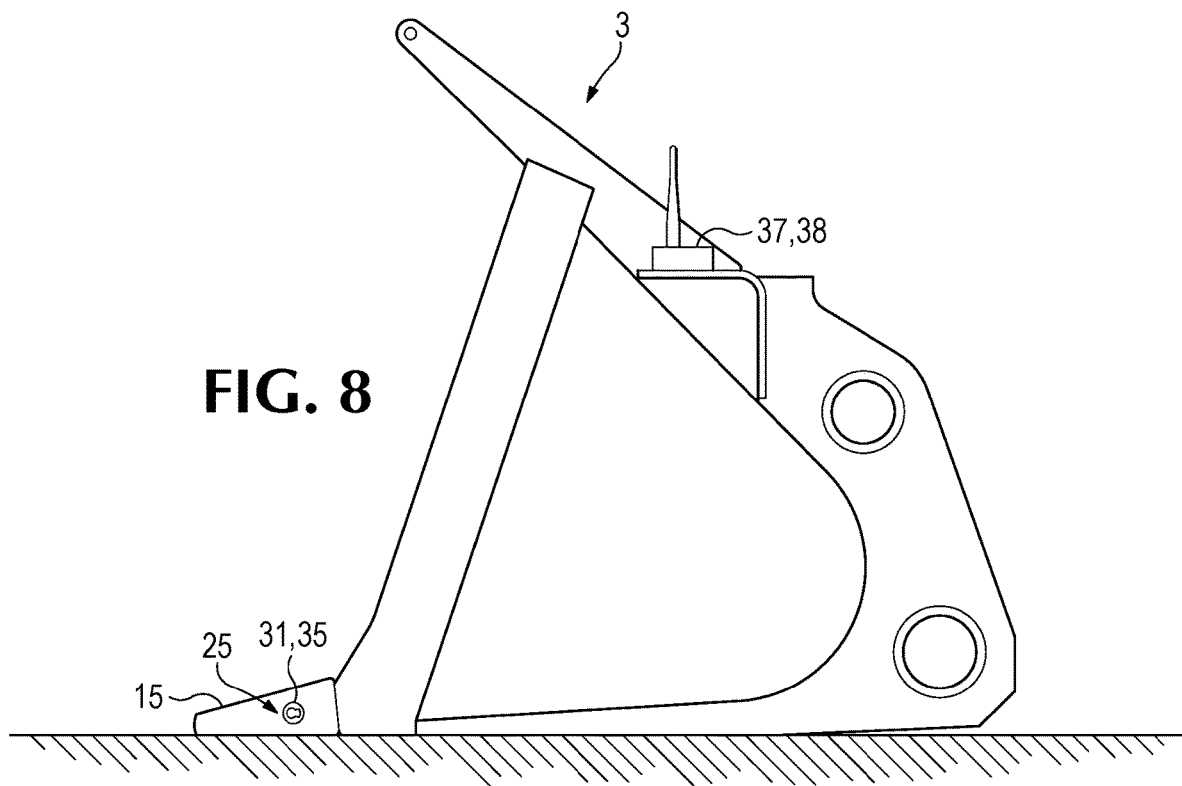
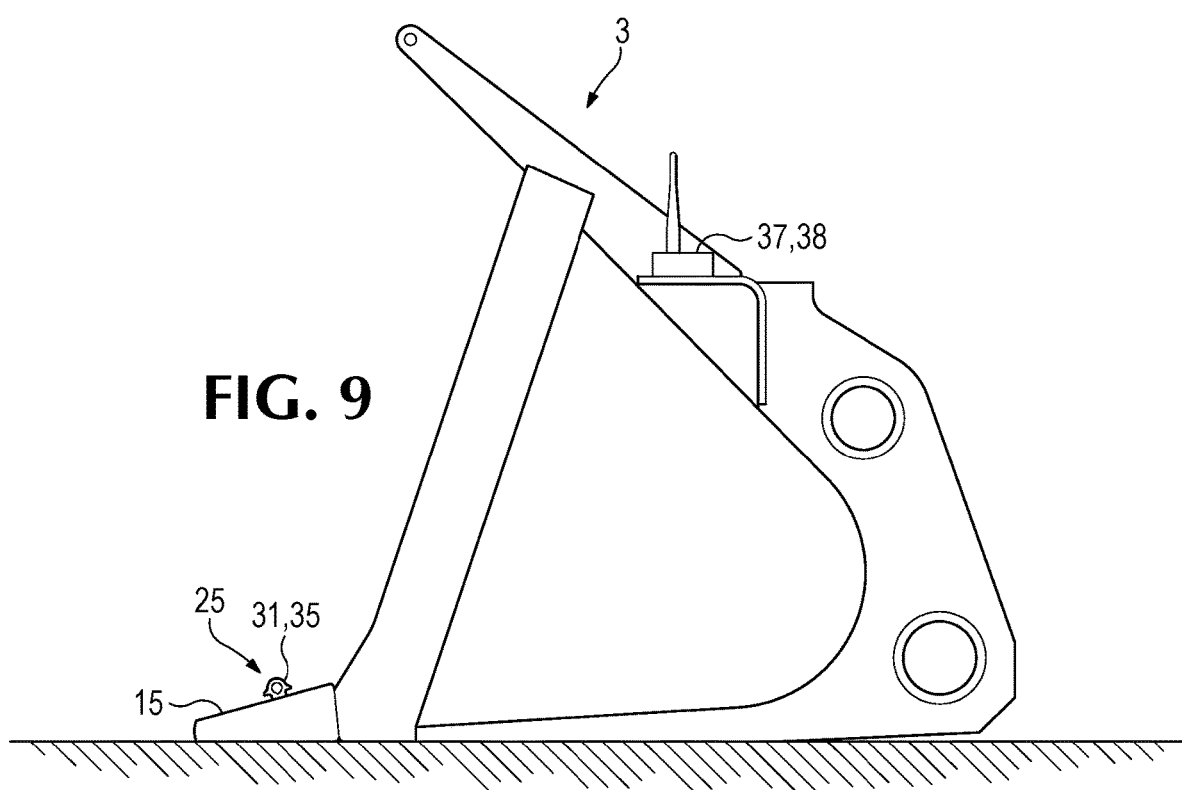

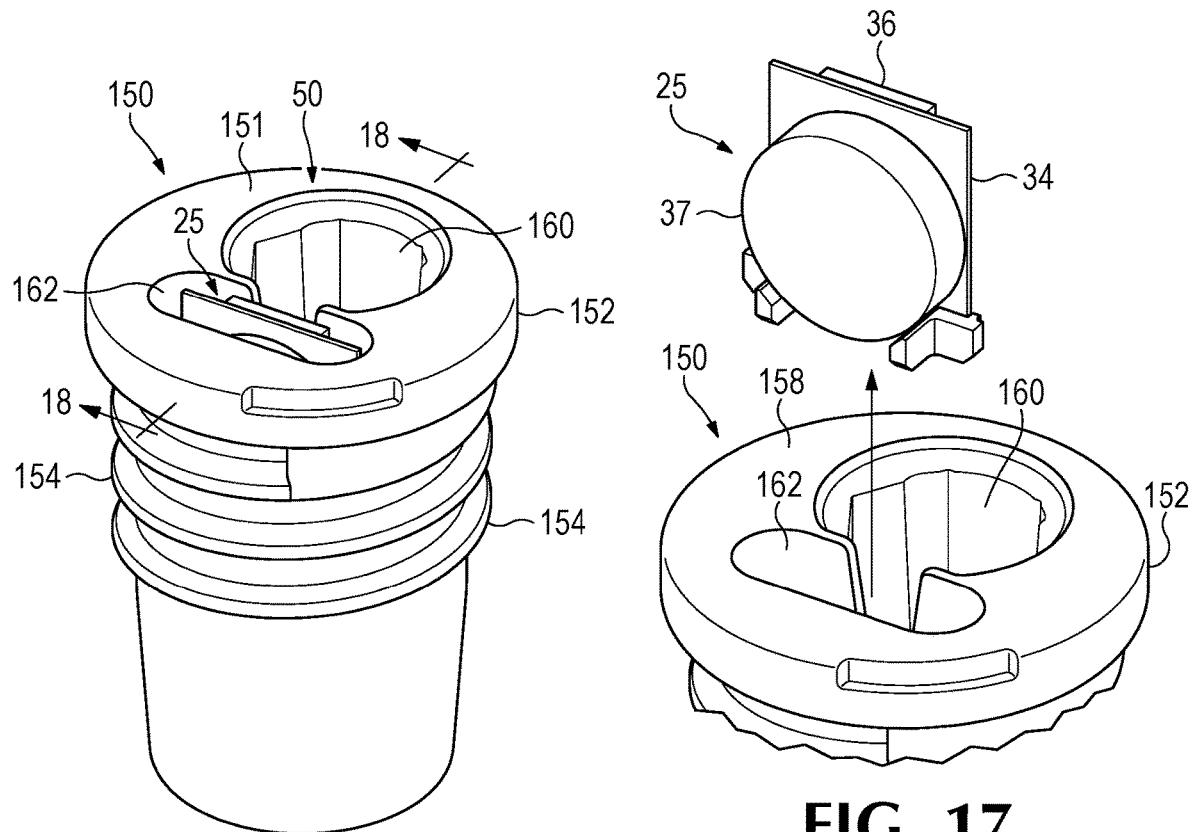
FIG. 16
FIG. 17
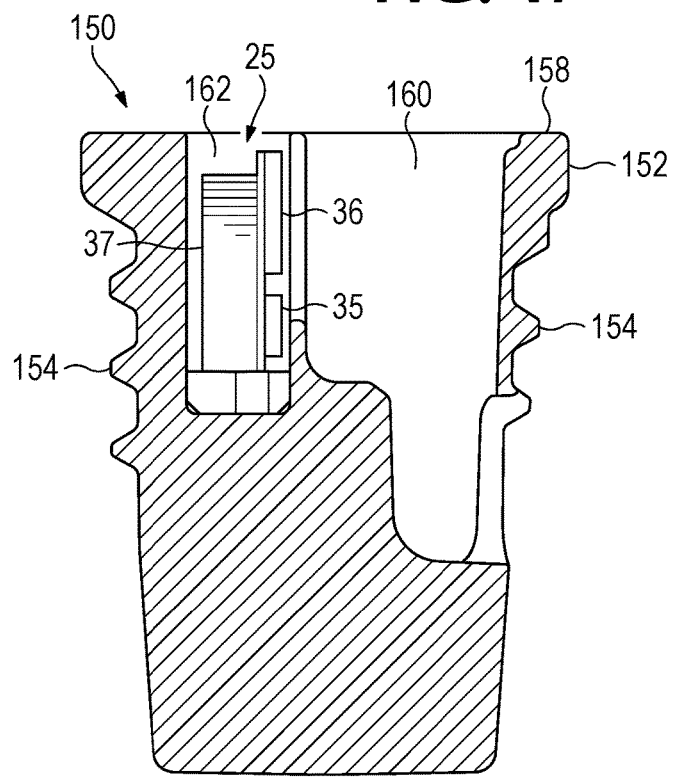
FIG. 18

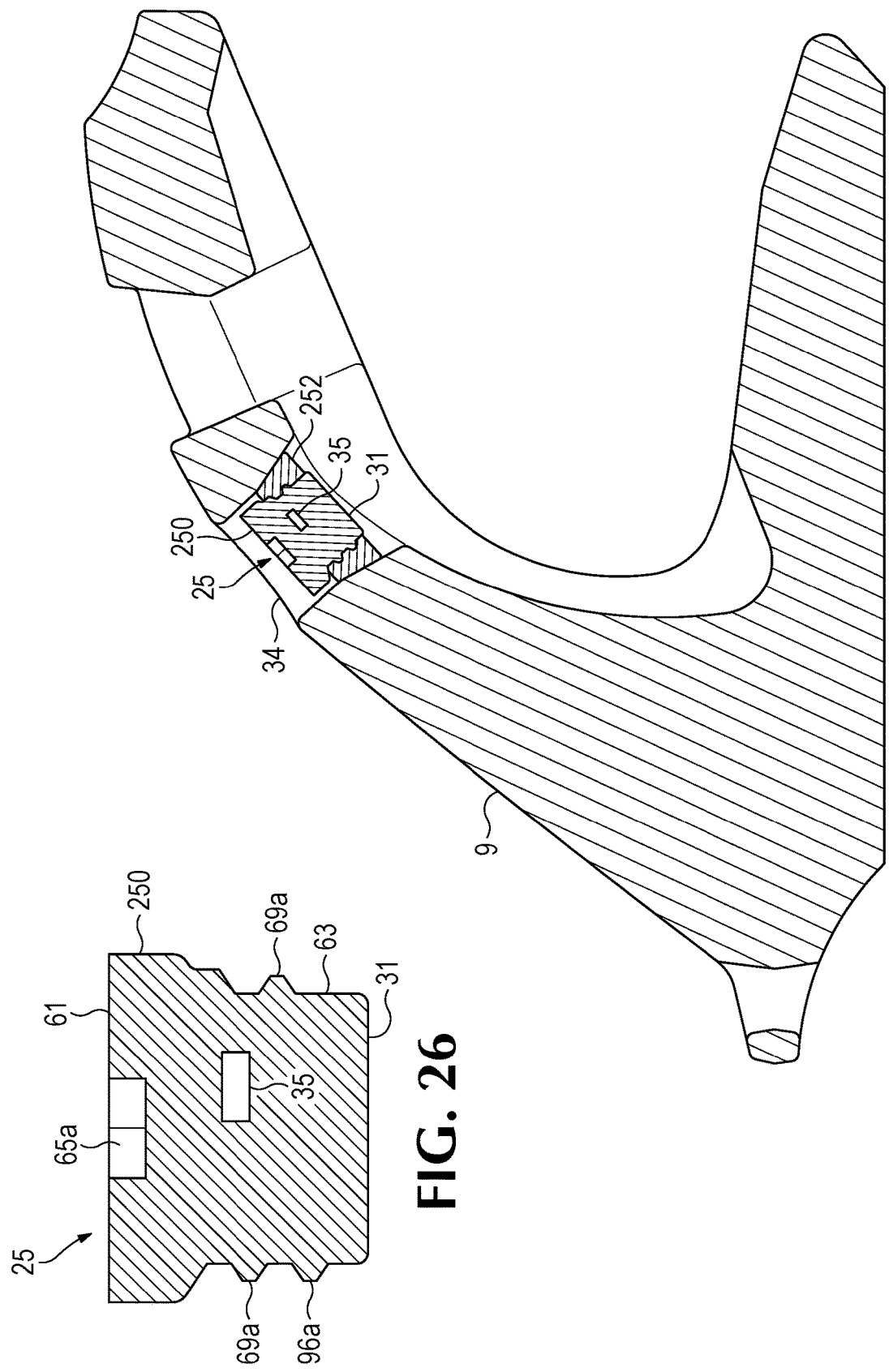

MONITORING GROUND-ENGAGING PRODUCTS FOR EARTH WORKING EQUIPMENT

RELATED APPLICATIONS

This application is a divisional of pending application Ser. No. 15/043,482, filed Feb. 12, 2016, entitled "Monitoring Ground-Engaging Products For Earth Working Equipment," which claims priority benefits to U.S. Provisional Patent Application No. 62/116,216 filed Feb. 13, 2015 and entitled "Wear Part Monitoring," U.S. Provisional Patent Application No. 62/151,124 filed Apr. 22, 2015 and entitled "Wear Part Monitoring," U.S. Provisional Patent Application No. 62/175,109 filed Jun. 12, 2015 and entitled "Wear Part Monitoring," U.S. Provisional Patent Application No. 62/198,552 filed Jul. 29, 2015 and entitled "Wear Part Monitoring," and U.S. Provisional Patent Application No. 62/234,463 filed Sep. 29, 2015 and entitled "Monitoring for Earth Working Equipment," each of which is incorporated herein by reference in its entirety.

FIELD OF THE INVENTION

The present invention pertains to a device and system for identifying and monitoring characteristics such as part identification, presence, condition, usage and/or performance of ground-engaging products such as ground engaging tools, wear plates, buckets, truck trays, and the like used on various kinds of earth working equipment.

BACKGROUND OF THE INVENTION

In earth working activities (e.g., mining, construction and dredging), ground engaging products are commonly provided on all kinds of earth working equipment (e.g., draglines, cable shovels, face shovels, hydraulic excavators, buckets, blades, rippers, dredge cutter heads, etc.) to protect the underlying equipment from undue wear and, in some cases, also perform other functions such as breaking up the ground ahead of the digging edge. Ground engaging products include, for example, buckets that mount on excavating machines, lips that attach to buckets, and teeth and shrouds that are secured to lips.

During use, ground-engaging products for earth working equipment can encounter heavy loading and highly abrasive conditions, which leads to wear or damage to the products, less remaining wear life of the products, and reduced efficiency for the earth working equipment. Moreover, a ground engaging product will occasionally encounter a material that is harder than the surrounding material being mined (e.g., a rock), subjecting the product to impact and/or higher loading that may lead to deformation, cracking, and/or a higher wear rate of the product than would otherwise be expected. The increase in the wear rate and/or damage caused to the ground engaging product may lower the total effective wear life of the product. If the products are not replaced at the appropriate time, a product may wear beyond the expected life and/or break or become unexpectedly separated, which may result in lower equipment digging efficiency, and may expose other components of the excavating equipment leading to the other components experiencing unnecessary wear.

Heavy loading and abrasive conditions can cause ground engaging products to become disengaged and separated from the earth working equipment. The operators of earth working equipment are not always able to see when a ground engaging product has become separated. A separated ground engaging product may cause damage to downstream processing equipment. For example, if a separated ground engaging product is fed into a crusher, the product may be ejected and cause a hazard to workers, or it may become jammed and cause costly crusher downtime. A jammed crusher requires shutting down the machine and having an operator dislodge the part, which at times may be a difficult, time-consuming and/or hazardous process. Additionally, continuing to operate the excavating equipment with missing ground engaging products can decrease overall productivity, and may cause the base, upon which the product was secured, to experience unnecessary wear.

There are existing systems that have been used to monitor wear parts in an effort to determine when a wear part needs replacement and/or has been lost with varying degrees of success. For example, the Tooth-Wear Monitoring system and Missing Tooth Detection system sold by Motion Metrics uses an optical camera mounted on the boom of the excavating equipment to determine the amount of wear in the wear parts and when wear parts are lost. Likewise, U.S. Pat. No. 8,411,930 discloses a system that relies on a video camera mounted to the boom of an excavating machine for detecting damaged or missing wear members.

In U.S. Pat. No. 6,870,485, a spring-loaded switch is provided between wear part components so that when the components separate, an electrical switch activates a radio transmitter alerting the operator that a wear part has been separated. In U.S. Pat. No. 5,743,031, an actuator is attached between the tooth and the nose, which, in one example, actuates a smoke canister to provide a visual signal that the tooth has fallen off.

U.S. Patent Application 2014/0311762 discloses a sensor within the mounting cavity of the wear part to measure the level of wear in the part. The sensor communicates the sensed data wirelessly to a processor for determining the level of wear. Fitting the sensor at the inner end of the cavity protects the sensor from wear and damage, and permits it to measure the wearable end of the part. Similarly, PCT Application WO 2012/0122587 discloses a system for monitoring wear in a liner or other ground engaging product by installing a sensor through the thickness of the part and connecting the remote end of the sensor to a processor for determining the level of wear. The remote end can connect to the processor via a cable or a wireless connection.

SUMMARY OF THE INVENTION

The present invention pertains to devices and systems for monitoring ground-engaging products for earth working equipment. The system can be used to monitor characteristics such as the part identification, presence, condition, usage and/or performance of ground-engaging products used on earth working equipment in mining, construction and other earth working environments.

In one aspect of the invention, the system may include at least one monitoring device associated with a ground engaging product, at least one remote device to cooperate with the monitoring device, and programmable logic to process the information communicated between the devices. The programmable logic uses the information to determine characteristics including, e.g., part identification, presence, condition, usage and/or performance of the ground engaging product attached to the earth working equipment.

In another aspect of the invention, ground-engaging products for earth working equipment are provided with one or more monitoring device proximate an external portion of the ground engaging product to limit signal blockage and increase reliability of the system. In one embodiment, the monitoring device includes a sensor, a wireless communication device and a battery contained within a recess open to an exterior of the ground engaging product and outside of the inner mounting cavity or other inner side of the ground engaging product. Contrary to conventional wisdom, a monitoring device located outside of the cavity or other inner surface of the ground-engaging products can survive in an earth working environment, such as digging, and can provide increased signal strength and reliability of the system.

In another aspect of the invention, a monitoring device is secured to one or more elements used to couple, protect, or otherwise enhance and/or enable the ground engaging assemblies. For example, the monitoring device may be secured to a lock holding a ground-engaging product to a base for earth working equipment. Such placement is preferably similarly outside of the cavity or other inner surface of the product for increased signal strength and reliability of the system. Further, placement of the monitoring system in or on the lock tends to provide a level of protection from premature damage and enables the detection of product loss. The use of a monitoring device associated with the lock can also detect events and/or relative movement between the product and the base in ways different from monitoring devices on or in the ground-engaging product, such as, for example, verification of proper lock installation.

In one embodiment of the invention, a lock for securing a ground-engaging product to a base for earth working equipment has at least one recess for receiving a monitoring device. In one example, one or more recesses may also be formed in the bit portion and/or mounting portion of a point. In another example, the recess can be in a lock engageable by a tool to adjust the lock for installation and removal of the product from the base.

In another aspect of the invention, a monitoring device can be located in a structure outside of the primary wear surfaces of the ground engaging product. In one embodiment, the monitoring device can be located within a lifting eye for the ground engaging product.

In another aspect of the invention, one or more monitoring device may be disposed relative to one or more surfaces of the ground engaging product subjected to wear such that the monitoring device(s) can measure multiple locations on the product and/or multiple kinds of data (such as wear, impact, etc.) experienced during digging.

In another aspect of the invention, ground engaging products are provided with removable monitoring devices. The use of a temporary mounting arrangement permits, for example, the same monitoring device to be used with different ground engaging products, different monitoring devices with different sensors to be used collectively or independently in the same ground engaging product, replacement of damaged or broken monitoring devices, and/or replacement of monitoring devices with low or dead batteries. In one embodiment, a sensor may be secured in a body that is mechanically attached to the product for easy and quick installation and removal. As one example, a sensor may be retained in a mechanically attached lifting eye for a ground engaging product. As another example, the sensor may be secured to resilient plug fit into recess.

In another aspect of the invention, each ground engaging product on a digging edge includes at least one monitoring device. The monitoring devices are detected by each other and/or a remote device to determine whether they are in established relative positions for the equipment on which they are secured. Loss of a product member is detected when one monitoring device deviates beyond a certain range from its established position, or orientation.

In another aspect of the invention, a product is provided with a monitoring device that communicates wirelessly using any of a variety of radio frequency protocols. The particular protocol may depend on the particular application and/or environment. A radio frequency device in accordance with the present disclosure may transmit characteristics such as part ID, presence, condition, usage and/or performance of the ground engaging product.

In another aspect of the invention, a monitoring device is secured to a ground engaging product to monitor characteristics such as part ID, presence, condition, usage and/or performance of the ground engaging product. As examples, the at least one monitoring device may include one or more sensors from a group consisting of radio frequency enabled modules, orientation sensors, temperature sensors, accelerometers, proximity sensors, force sensors, and position sensors.

In another aspect of the invention, a monitoring device secured to a ground engaging product is used to detect its presence in a body of material (such as in the load of a haul truck, dump pile, etc.). This feature can improve the ability to locate a lost ground engaging product and reduce the risk of damaging or jamming downstream processing equipment (e.g., a crusher).

In another aspect of the invention, remote devices can be provided on other equipment related to the monitored earth working equipment. In one embodiment, a remote device can be provided on the top, side edge of a crusher hopper, a side edge of a haul truck tray, and the like, to detect characteristics such as the presence of the ground engaging products on the bucket, tracking the number of loads to fill the truck tray, monitor the speed of digging cycles, etc. In another embodiment, a remote device can be provided on a truck, handheld device, other standalone equipment, etc.

In another aspect of the invention, a remote device can provide an alert to an operator (e.g., of a digging machine or haul truck), remote supervisor, etc. to indicate at least one of the monitored characteristics, e.g., the loss of a ground engaging product from a bucket, the presence of a ground engaging product in the haul truck load, a ground engaging product approaching fully worn condition, a ground engaging product exceeding target impact loads during use, etc.

In another aspect of the invention, a monitoring device can provide real-time assessment of characteristics of an operation. For example, the monitoring device can monitor the load gathered in a bucket and in the truck tray being filled to provide information to the operator on more efficiently filling the truck tray.

In another aspect of the invention, a monitoring device can be used to capture data usable to map a mine site or other earth working site to estimate characteristics of the ground-engaging products on earth working equipment used at the site. For example, the gathered data could be used to generate contour-style mapping of wear rates for ground-engaging products to better determine such things as product replacement schedules, costs, etc. The data could be used to map other characteristics or process the site data in ways other than mapping to generate similar information.

The various above-noted aspects and embodiments of the invention can be used independently of each other or collectively with all or some of the different aspects of the invention. The noted aspects are exemplary summary observations of certain ideas of the various concepts of the invention and are not intended to be exhaustive or essential. To gain an improved understanding of the advantages and features of the invention, reference may be made to the following description and accompanying Figures that describe and illustrate various configurations and concepts related to the invention.

BRIEF DESCRIPTION OF THE DRAWINGS

FIG. 3 is a perspective view of a lip of a bucket with teeth and shrouds.

FIG. 4 is a perspective view of one of the tooth assemblies shown in FIG. 3.

FIG. 5 is an exploded perspective view of the tooth assembly shown in FIG. 4.

FIG. 7A is a side view of the tooth assembly mounted on a lip.

FIG. 7B is a scaled up partial cross-section view illustrating a monitoring device installed in the tooth shown in FIG. 7A.

FIG. 8 is a side view of a first bucket with a remote device.

FIG. 9 is a side view of a second bucket with a remote device.

FIG. 16 is a perspective view of a pin component of a lock with a monitoring device.

FIG. 17 is an exploded perspective view of the pin component.

FIG. 18 is a cross-sectional view taken along line 18-18 in FIG. 16.

FIG. 26 is a sectional view of a handling plug.

FIG. 27 is a sectional view of a shroud with the handling plug of FIG. 26.

DETAILED DESCRIPTION OF PREFERRED EMBODIMENTS

The present invention pertains to products and monitoring systems for monitoring characteristics such as the part identification, presence, condition, usage and/or performance of ground-engaging products for use on earth working equipment. As examples, the system can be used to monitor ground-engaging products secured to dozers, loaders, dragline machines, cable shovels, face shovels, hydraulic excavators, dredge cutters, buckets, lips, blades, rippers, shear drums, continuous miners, etc. Examples of such ground-engaging products include buckets, lips, blades, points, adapters, intermediate adapters, shrouds, runners, picks, wear plate, truck trays, etc. The system can identify and/or monitor characteristics including, e.g., the part ID, presence, condition, usage and/or performance of one or more of the ground-engaging products on earth working equipment.

Relative terms such as front, rear, top, bottom and the like are used for convenience of discussion. The terms front or forward are generally used to indicate the usual direction of travel of the ground engaging product relative to the earthen material during use (e.g., while digging), and upper or top are generally used as a reference to the surface over which the material generally passes when, for example, it is gathered into the bucket. Nevertheless, it is recognized that in the operation of various earth working equipment the ground engaging products may be oriented in various ways and move in all kinds of directions during use.

For ease of discussion, this application generally discusses monitoring a ground engaging product on a base secured to an excavating bucket, and in particular monitoring one kind of excavating tooth. However, the invention could be used to identify or monitor other kinds of teeth, other kinds of ground-engaging products, and products on various types of earth working equipment. As examples only, the monitoring system may monitor a point on an adapter, a point on an intermediate adapter, an intermediate adapter on an adapter or integral cast nose, a shroud on a lip or base, a lip on a bucket, a wear runner on a bucket, modular wear pads, a blade on a mold board, a bucket on a boom, teeth on a dredge cutter head, picks on a shearer drum, wear plate on a bucket, liners on a chute or truck tray, a truck tray on a haul truck, and the like. The ground-engaging products may be attached to various other ground engaging products, and may be attached using mechanical attachments, including locks and the like, or may be welded, adhered, or otherwise secured in place.

Figure 1:
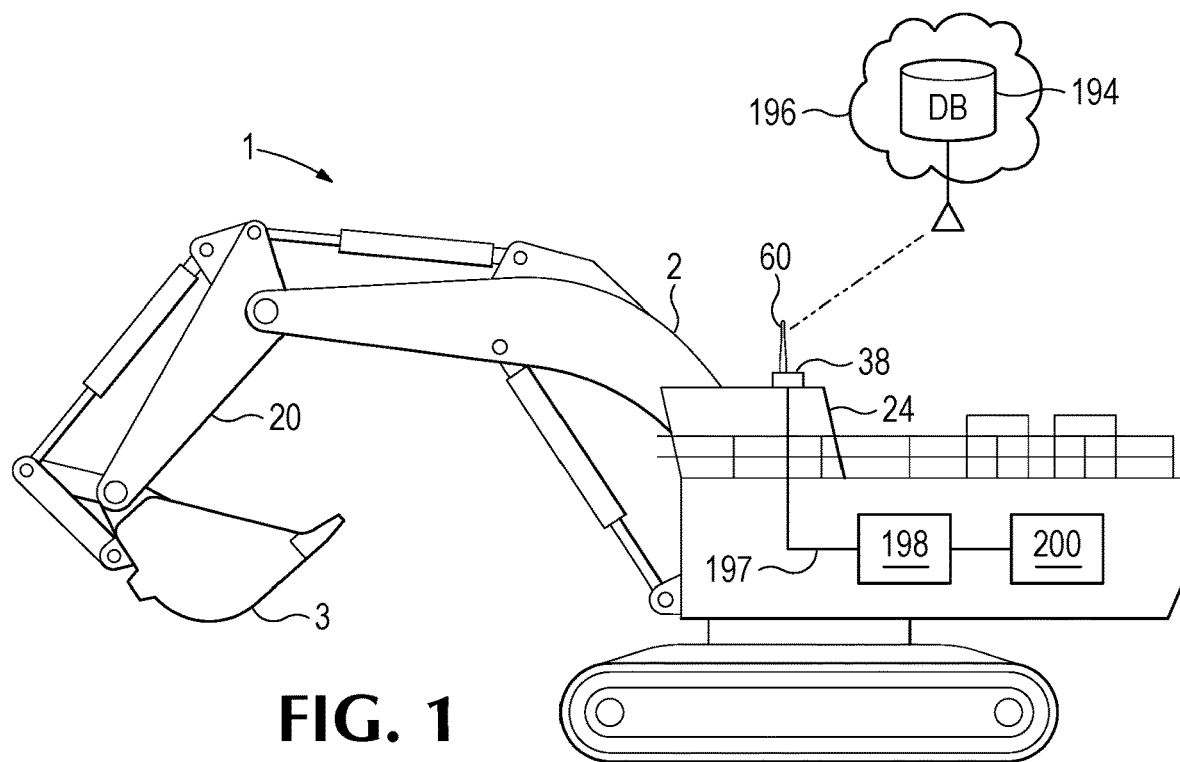
FIG. 1 is a side view of a mining excavator.
Figure 2:
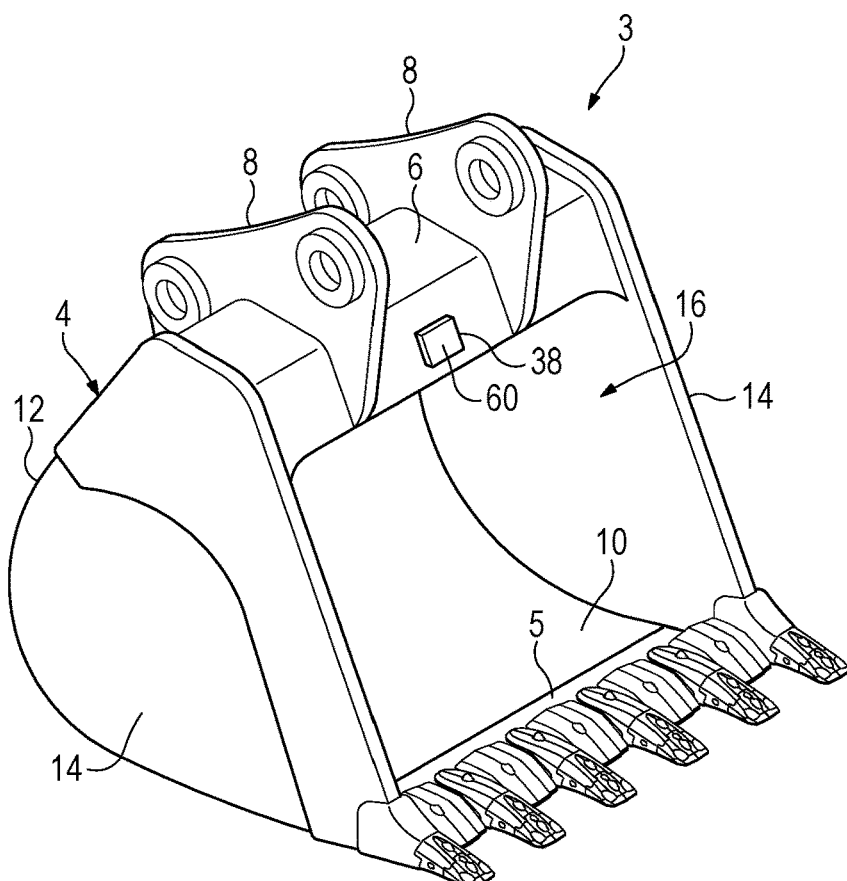
FIG. 2 is a perspective view of a hoe bucket.

As an example, a mining excavator 1 is equipped with a bucket 3 for gathering earthen material while digging (FIG. 1). The bucket 3 includes a frame or shell 4 defining a cavity 16 for gathering material during the digging operation (FIG. 2). Shell 4 includes a top wall 6 having attachment supports 8 to attach the bucket 3 to excavator 1, a bottom wall 10 opposite the top wall 6, a rear wall 12, and a pair of opposing sidewalls 14. Multiple configurations of buckets are known and variations in bucket geometry exist for excavating buckets and, of course, other excavating machines. For example, the bucket may not have a top wall as in a dragline bucket, the bottom wall may be hinged as in a dipper bucket, or a portion of the side walls may be hinged as in a hydraulic face shovel. The specific geometry of the bucket is not intended to be limiting as the present system can be used with various types of buckets and with various types of ground engaging products used on the buckets or other earth working equipment.

In this embodiment, bucket 3 has a digging edge 5 (FIGS. 2-3, 5 and 7). The digging edge is that portion of the equipment that leads the contact with the ground and in an excavator bucket is generally formed by a lip. Sidewalls 14 of a bucket 3 commonly also form a portion of the digging edge and at times include wear parts. Teeth and/or shrouds are often secured to the digging edge to protect the edge and break up the ground ahead of the bucket 3. Multiple tooth assemblies 7 and shrouds 9, such as disclosed in U.S. Pat. No. 9,222,243, which is incorporated by reference in its entirety, may be attached to lip 5 of bucket 3. The illustrated tooth 7, provided only as an example, includes an adapter 11 welded to lip 5, an intermediate adapter 13 mounted on adapter 11, and a point (also called a tip) 15 mounted on intermediate adapter 13 (FIGS. 1-5 and 7). Point 15 includes a rearward-opening cavity 18 in a mounting portion to receive nose 17, and a front end or bit portion 19 to penetrate the ground (FIG. 5). Locks (also called retainers) 21 are used to secure point 15 to intermediate adapter 13, and intermediate adapter 13 to a nose 23 of the adapter 11. In this embodiment, the locks 21 are all the same but they would not need to be. Other tooth arrangements are possible (See, e.g., FIG. 6).

When a ground engaging product becomes unexpectedly separated from the base or the ground engaging product reaches a minimum recommended wear condition (e.g., the ground engaging product is considered fully worn), the ground engaging product is replaced so production does not decrease and the base, upon which the ground engaging product is attached, does not experience unnecessary wear.

In one embodiment, a monitoring device 25 is provided to monitor a ground-engaging product (in this case, tip 15 on intermediate adapter 13) mounted on a bucket (FIGS. 2-5). A plurality of monitoring devices 25 could be provided in a single product 15 to monitor the wear (or other characteristic) on different surfaces or at different portions of the same surface, or to monitor different characteristics of the use (e.g, wear, impact, strain, etc.). Additionally, a plurality of monitoring devices 25 could be provided to monitor multiple ground engaging products (points, intermediate adapters, etc.) connected to the bucket.

Monitoring device 25 may generally include: one or more electronic devices or sensors 35 for identifying characteristics such as part ID, presence, condition, usage and/or performance of the ground engaging product; a communication device 36 (e.g., a transmitter and/or receiver) for communicating information to and/or from the monitoring device to or from a remote device 38 (discussed below); and a battery 37. These can be different components working together or they may be combined (e.g., with the sensor 35 and transmission device 36 being the same component). Monitoring devices 25 also could have other constructions. For example, monitoring devices can include multiple sensors for redundancy or sensing other characteristics (e.g., high impact events, digging cycles, etc.), a receiver for receiving information from a remote device, storage mediums for holding data (e.g., the part ID), a GPS device, and/or a microprocessor for processing data or other information. A monitoring device 25 may also be a passive system without a transmitter or battery.

Figure 10:
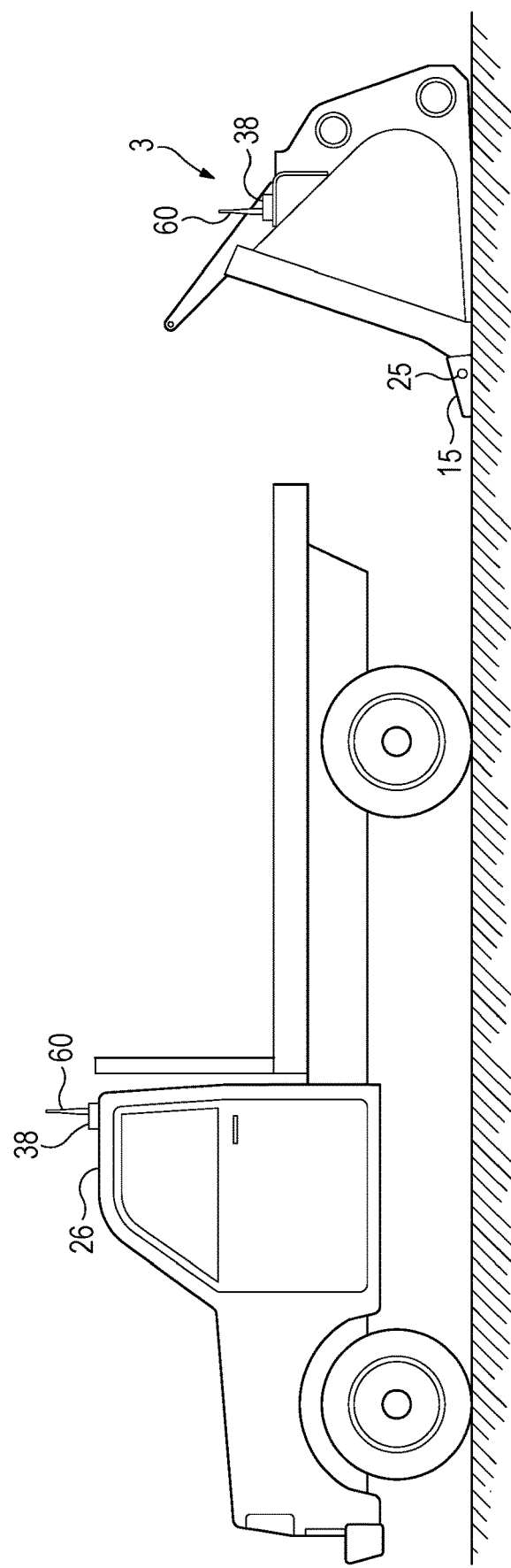
FIG. 10 is a side view of a vehicle with a remote device.
Figure 11:
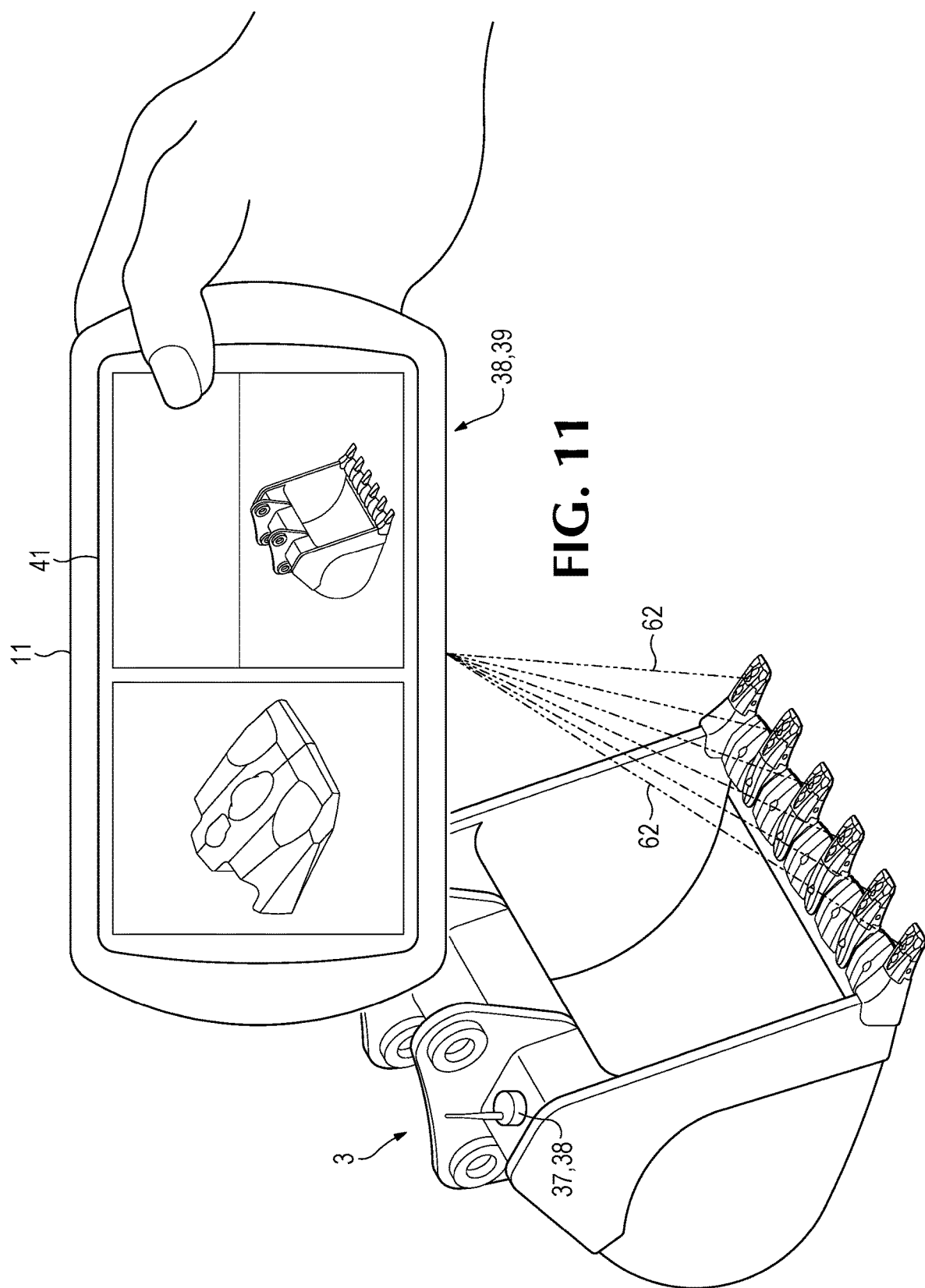
FIG. 11 is a perspective view of a bucket and a handheld remote device.

Monitoring devices 25 may communicate with a remote device 38, which simply means a device remote from the monitoring device 25. The remote device 38 can be secured to a different portion of the ground engaging product being monitored. For example, when the ground engaging product is a bucket 3, the monitoring device 25 could be in a ground-engaging portion of a sidewall 14 and the remote device 38 could be on the top wall 6 of the bucket 3. The remote device 38 could be indirectly connected to the monitored ground engaging product. For example, the monitoring device 25 could be retained in a tip 15 and the remote device 38 could be on the bucket 3 (FIGS. 8-9), on the boom 2, on the stick 20, or in the cab 24 of the digging machine 1. The remote device 38 could also be separately supported such as on a service truck (FIG. 19), drone, handheld device 39 (FIG. 11), station, etc. (FIGS. 10-11). A single remote device 38 may be used or a collection of remote devices 38 working together or separately may be used. As examples, a remote device may include a processer (PC, microprocessor, etc.), a database, a transmitter, a receiver, etc. The remote device 38 may communicate with additional sensors on the ground engaging product, other ground engaging products, multiple ground engaging products, earth working equipment 1 and/or with a database or computer. The remote device 38, for example, may be a wireless device or a wired device.

The monitoring device 25 and the remote device 38 can be designed to communicate with each other in different ways and no one particular way is needed. For example, the monitoring device 25 could be designed to only transmit information and the remote device 38 designed to only receive information from the monitoring device 25. In other examples, the monitoring device 25 and the remote device 38 could be designed to communicate back and forth with each other. The communication may use various communication protocols, for example, without limitation, continuous, event driven, on demand, batch communication. Irrespective of the manner or timing of the communication, the information can be received and processed historically or as a real-time assessment. For example, if the signal is only available during a portion of the digging cycle, the remote device can still receive batch information of all the characteristics detected when the signal could not be accessed.

Figure 12:
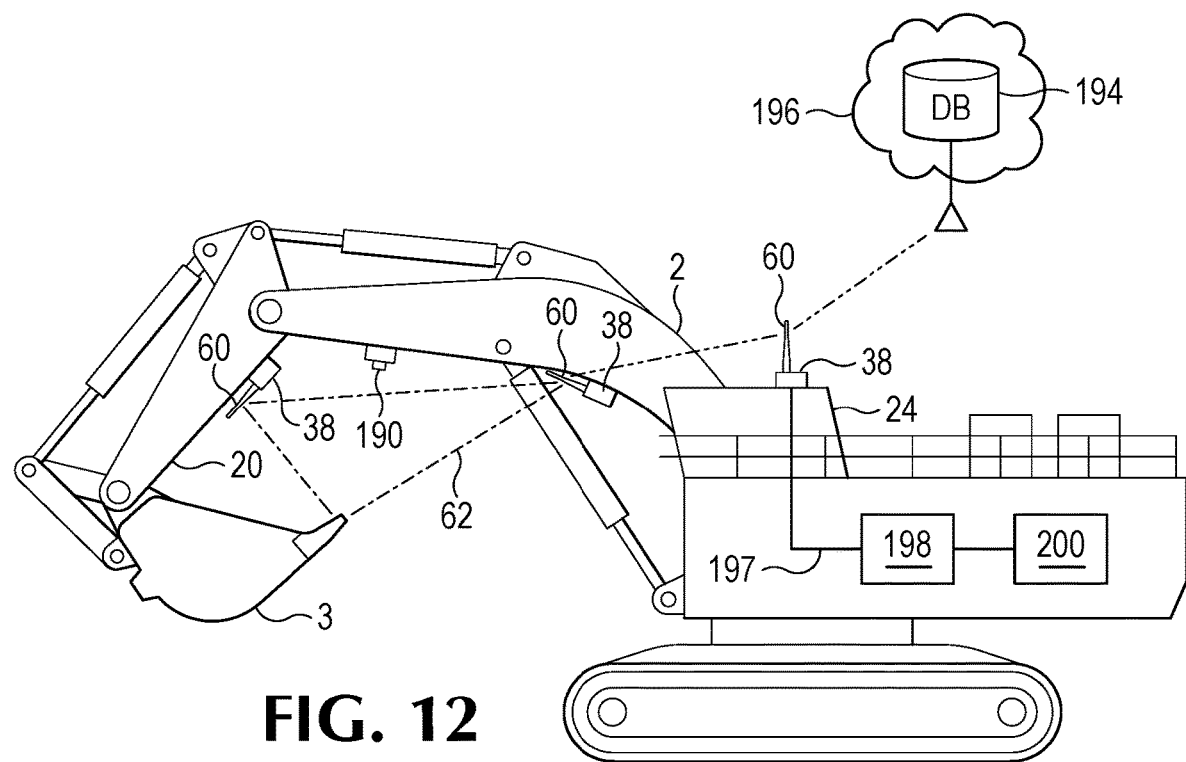
FIG. 12 is a side view of a mining excavator illustrating a number of signal paths.

The remote device 38 and the monitoring device 25 may on their own, collectively, and/or with other devices, and/or software applications, and the like (e.g., data from a database 194 in, for example, a cloud database, other processors, etc.) store, process and/or communicate information related to characteristics such as part ID, usage, condition, performance and/or presence of the ground engaging product on earth working equipment (FIG. 12). Information related to the part ID of ground engaging product can include such things as ground engaging product type, product number, customer number, brand name, trademark, manufacturer, bill of materials, etc. Information related to usage of the ground engaging product can include such things as the kind of machine using the ground engaging product, time the ground engaging product went into service, how many digging cycles the ground engaging product has experienced, average time of the digging cycle, location of the ground engaging product on the machine, impact events, etc. The part ID may be used as search criteria in order to retrieve additional information regarding the specific ground engaging product. The search criteria may be used to query one or more relational databases and/or broader data structures. Information related to condition of the ground engaging product can include such things as wear, strain in the ground engaging product, etc. Information related to performance can include such things as the rate of digging, force needed to penetrate the ground, tons moved per each increment of wear, etc. These characteristics could also be used in connection with information regarding the mine geology, material fragmentation and/or other information for, e.g., determining timetables for excavating material, replacement schedules for ground engaging products, etc. Devices 25 can also be used to detect ground engaging product loss (i.e., presence of the ground engaging product). These monitored characteristics are given as examples only and are not intended to be limiting. Information may be shared with, i.e. sent to and received from, various other machines including programmable logic, other networks, and used with various software applications, and routines.

Figure 5A:
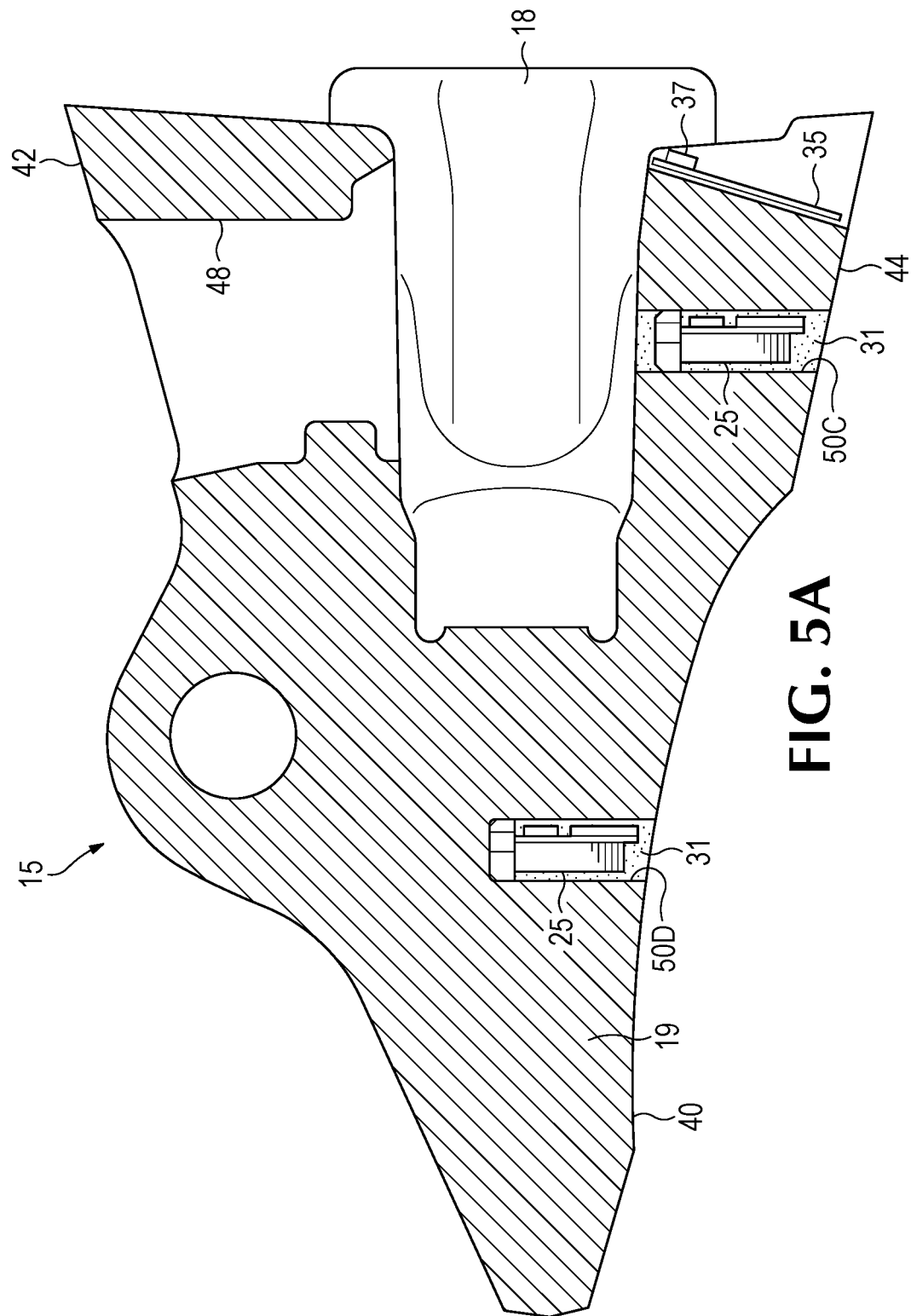
FIG. 5A is a cross section view of the tip taken along line 5A-5A in FIG. 5.
Figure 6:
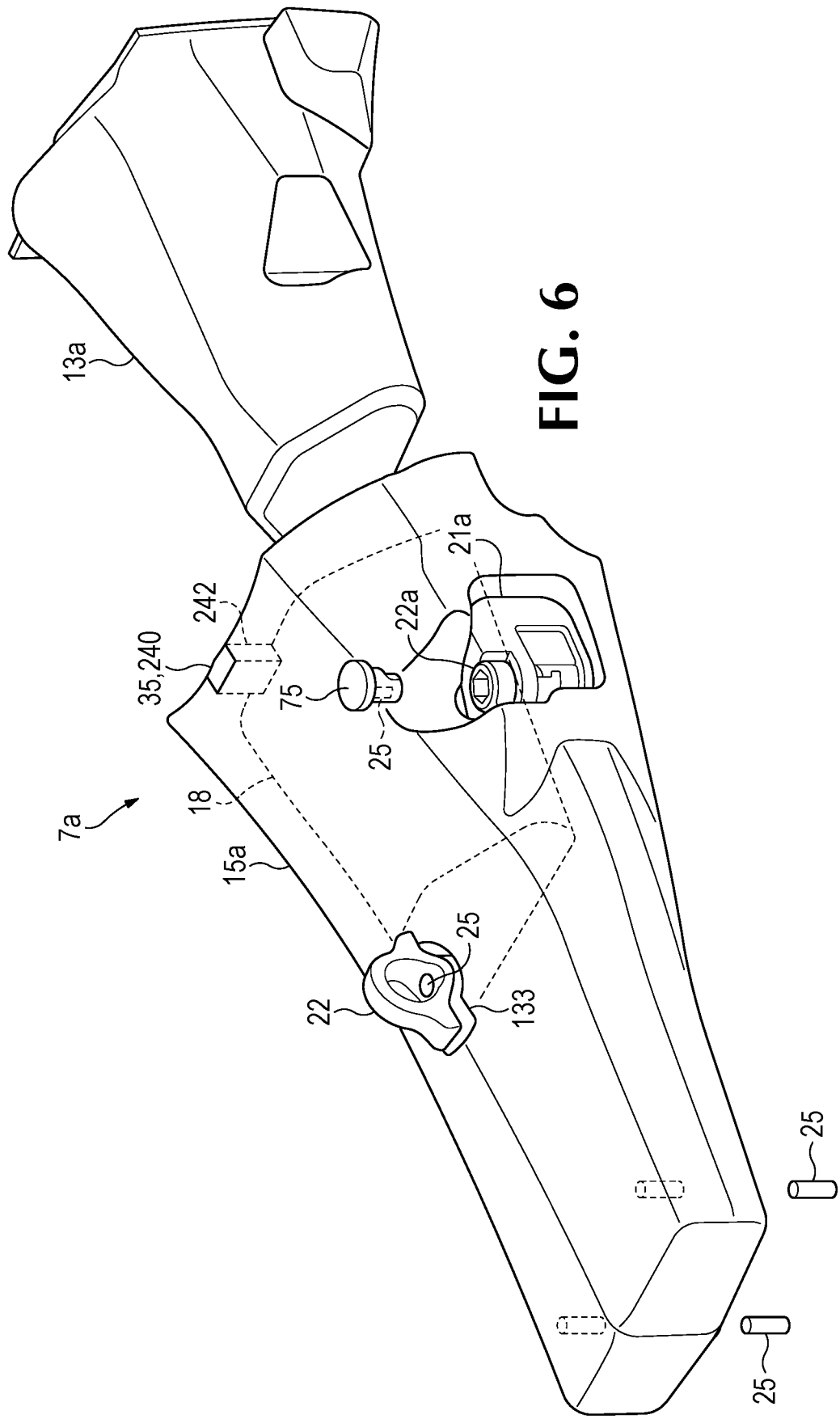
FIG. 6 is an exploded perspective view of another example tooth assembly.

In one embodiment, the ground-engaging product 15 includes an external surface 40 having a top surface 42, a bottom surface 44 and side surfaces 46 (FIGS. 5-7). A cavity 18 is formed to open in the rear end of the product 15 to receive the base 13 for mounting the product on the equipment. A lock opening 48 is formed in the product to receive a lock 21 that holds the product to the base 13 (FIG. 5). In one embodiment, a recess 50 is defined in the external surface 40 of the product for receiving a monitoring device 25 (FIG. 5A). In the illustrated embodiment, a monitoring device is provided in a recess 50C in the mounting portion of tip 15, and in a recess 50D in a working portion or bit portion of tip 15. Product 15 may include only one or more than two recesses and monitoring devices. As discussed further below, in other embodiments, a recess 50 may also, or instead, be defined in a component of the assembly that may be located proximate the external surface 40. Components with a monitoring device 25 may include, but may not be limited to, locks 21, lifting eyes 22, and/or plugs 75. The component(s) may in turn be located in an appropriate recess or socket of the assembly. In any of the embodiments, the monitoring device 25 is preferably positioned proximate the external surface 40 and outward of the mounting cavity 18 to lessen the signal blocking effects of the heavy steel walls of the ground engaging product (though the monitoring device can be differently positioned relative to the ground engaging product). In the illustrated embodiment, monitoring devices 25 in recesses 50C, 50D are both outward of the mounting cavity 18. This arrangement enables the signal transmitted to or by monitoring device 25 to be more easily and reliably received by remote device 38 or monitoring device 25 to provide a more reliably received signal for the system as compared to installing monitoring device 25 on the inside of the part, e.g., within the mounting cavity 18 of the product as has been done in prior systems. This same benefit would exist for a monitoring device receiving signals from the remote device or other monitoring devices. The monitoring device 25 can generally survive the rigors associated with an earth working operation in a more shallow recess and does not need to be placed in an innermost portion of the ground engaging product. Past systems have generally suffered from reliability in detecting loss and wear of ground engaging products resulting in false alarms and undetected loss or wear. Reliability can be improved by moving the monitoring device 25 or at least the communication device (e.g., a transmitter and/or receiver) of the monitoring device 25 closer to the external surface of the ground engaging product (i.e., outside of the inner surface). While the recess 50 can be a blind hole, it need not be. Generally, at least the communication device 36 (e.g., a transmitter) of the monitoring device is located just far enough into the ground engaging product to avoid being worn away during the expected useful life of the ground engaging product. Depending on the sensor 35, the sensor portion of the monitoring device can lie below the maximum wear point or can extend into the wearable portion and be worn away during use. Alternatively, the monitoring device 25 can be positioned entirely within the wearable portion if it is intended to only provide monitoring for a portion of the useful life of the ground engaging product.

U.S. Patent Application 2014/0311762 discloses a sensor within the mounting cavity of the wear part to measure the level of wear in the part. Fitting the sensor at the inner end of the cavity protects the sensor from wear and damage. However, the signal is at risk of being lost and not successfully transmitted to the processor on account of blockage by the heavy steel of the ground engaging product, the ground the ground engaging product engages, and/or the bulk, electronics, hydraulics, etc. of the earth working equipment. Similarly, PCT Application WO 2012/0122587 discloses a system for monitoring wear in a liner or other ground engaging product by installing a sensor through the thickness of the part and connecting the remote end of the sensor to a processor for determining the level of wear. The remote end can connect to the processor via a cable or a wireless connection. However, the use of a cable to hard wire the sensor to the processor is not feasible in many earth working operations, and similar wireless communication difficulties exist by locating the transmitter on the inside of the wear part.

Figure 14B:
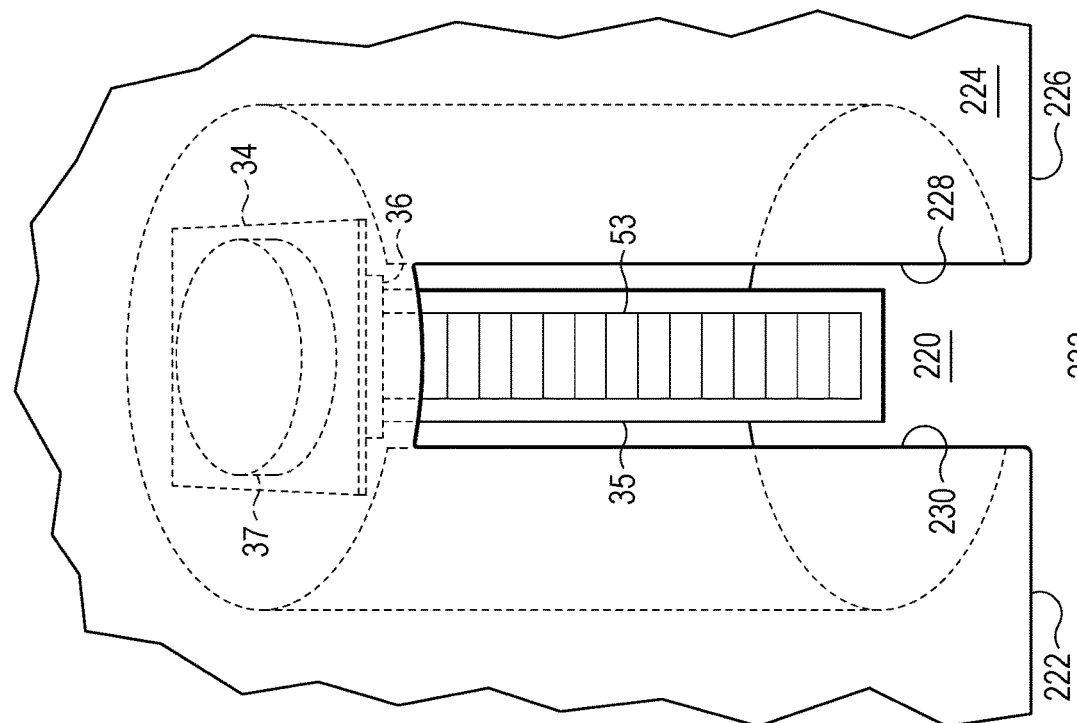
FIG. 14B is a cutaway view illustrating an example monitoring device.
Figure 14A:
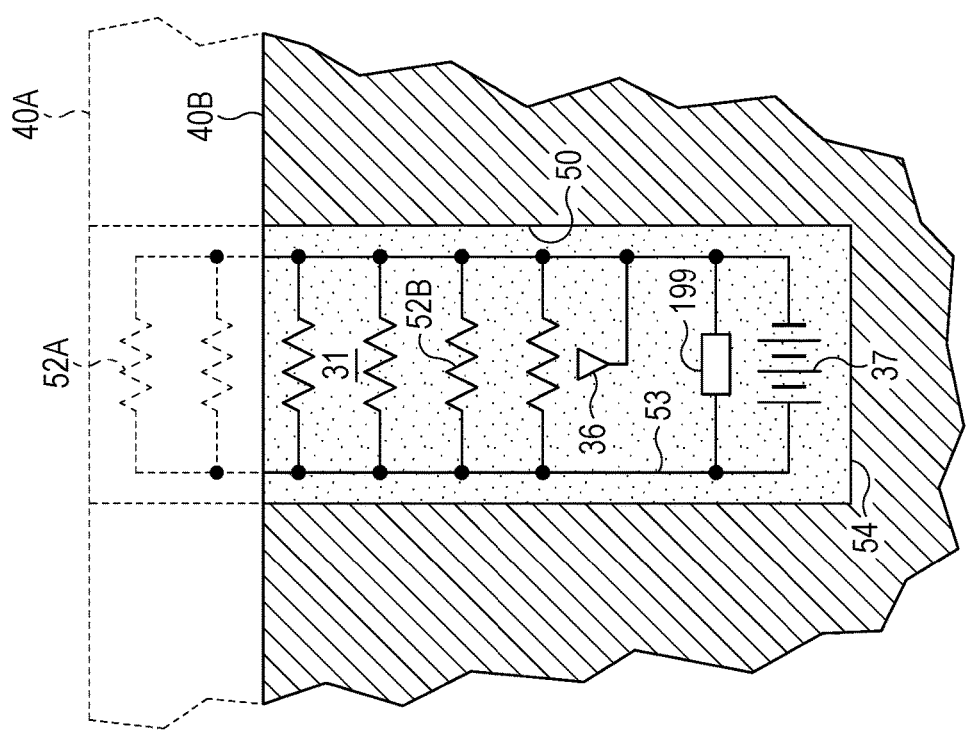
FIG. 14A is a schematic view illustrating an example monitoring device.
Figure 15:
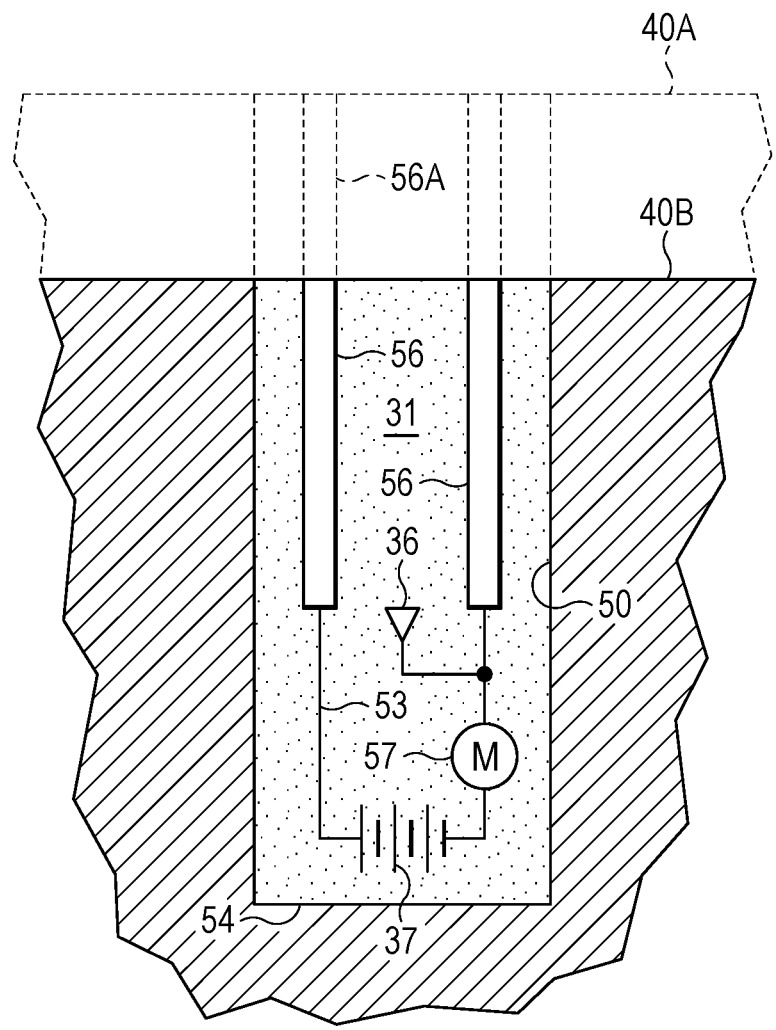
FIG. 15 is a schematic view illustrating another example monitoring device.

In one embodiment, the sensor 35 is a wearable resistor ladder 52 positioned in a recess 50 defined in a bottom surface 44 of tip 15 (FIGS. 5A and 14A). As the surface 40A wears resistors 52A are disconnected. Resistors 52B below an unworn surface 40B remain in the circuit 53. As the resistor ladder 52 wears, the resistance changes providing an indication of the amount or degree of wear that the ground engaging product has experienced. A transmitter 36 and a battery 37 are provided at, or near, the base 54 of the recess 50 to send a signal to the remote device 38. A processing, and/or memory device may be included. A micro-control unit (MCU) 199 is illustrated in this example embodiment. The MCU may optionally include a processor and a storage device to process and store data from the sensor, and/or other data devices in the system in accordance with the disclosure. The MCU may optionally include an onboard antenna. The monitoring device 25 may provide collected data using various mechanism, and may be, for example, an active responder, or a passive responder. The monitoring device 25 may be a near field communicator (NFC). Other variations are possible. For example, a circuit board with a series of wired loops could be used. As another example, a pair of elongate capacitor plates 56 could extend along the sides of the recess and wear away as the ground engaging product wears (FIG. 15). A metering device 55 may measure the capacitance, resistance or other value. A cylindrical capacitor having concentric plates may also, or instead, be used. A plurality of discrete capacitors or other devices may also, or instead, be used. Other kinds of sensors (e.g., ultrasonic) could be used to measure the degree of wear or other desired characteristic of the ground engaging product or its use. Monitoring device 25 could also be a passive system that is detected by signals transmitted by the remote device.

Recess 50 may be filled in with a filler or body 31 in the form of resin, polymer or other suitable material once the monitoring device 25 has been installed within the recess. The filler 31 may be a dielectric material. The monitoring device 25 may be secured by means other than the body (e.g., an adhesive, mechanical means, etc.) or secured in the recess by body 31. In one embodiment, body 31 is a polymer selected from a group consisting of elastomers, thermoplastics, and thermosets. In alternative embodiments, the recess 50 may be filled in with a material other than polymers or may not be filled in. Securing the devices 25 in a polymer and/or filling the recess 50 with a polymer may further protect the device 25 from fines, vibration and impact as the ground engaging product engages the material to be excavated and/or secure the monitoring device in the recess.

The monitoring device 25 sends, e.g., a continual, intermittent, batch, or event driven signal concerning, e.g., the characteristic of the ground-engaging product 15. In the illustrated example, the signal is received by a receiver 60, which in this example includes an antenna of the remote device 38 mounted on the boom 2 of the excavator 1 (FIG. 12). An antenna 60 can be provided in other positions and mounted on different supports (e.g., on the bucket 3, in the cab 24, etc.) in lieu of or in addition to the antenna on the boom. An antenna 60 on the boom 2 is provided in this embodiment to improve the reliability of receiving the signal from monitoring device 38. The antenna 60 on the cab 24 in this embodiment is shown wired 197 to a processor 198 in the cab 24 but could have a different connection. For example, an antenna or other receiver could be mounted in the cab, on a truck, on a handheld device 39, etc. The antenna 60 could be coupled to a wireless transmitter such that the information received from the monitoring device 25 and sent to the remote device 38 in the cab, may be provided to and/or combined with data from a handheld device 39, cloud database 194, other data sources, etc. to provide helpful information and analysis. Multiple antennas and/or remote devices 38 could be used to increase the reliability of picking up the signal if desired or needed for the particular operation. For example, a remote device may also be located on the stick 20. The processor 198, or other elements of the system, may be operatively coupled with an Engine Control Unit ECU 200. The ECU 200 may provide or receive information from the processor 198 and/or directly from the sensor(s) 35. The ECU 200 may provide data pertaining to, but not limited to, engine torque, fuel consumption, atmospheric temperature, engine temperature and the like. The ECU data may be coupled with sensor data, and/or data from other sources, and processed by the processor to provide various outputs.

This embodiment provides a relatively unobstructed signal path 62 for the monitoring device 25 to provide information to remote device 38, i.e., by way of the antenna 60 of remote device 38. Nevertheless, other variations are possible that have more obstructions, limited time periods where signals can be received, etc. In cases where signals can only be received at certain times, monitoring device 25 and/or remote device 38 may transmit only during certain times (e.g., when the bucket is oriented in a particular way, when a trigger signal is received, etc.) or may continue to transmit continually. Further, multiple remote devices and/or antennas could be used to receive information from the monitoring device continually or during longer periods even if the signal can only be accessed by the antenna on the boom 2 during certain intervals. A remote device may receive a signal from a monitoring device and relay the signal to a second or third remote device. Any number of remote devices may be used to relay the signals as needed. The movement of the digging machine 1, including the individual articulated components thereof, and/or other vehicles at the worksite may tend to establish and reestablish the interrelationships of the sensors and communication devices. In this way, various and numerous communication paths may be established despite the great number of potentially shielding surfaces at the worksite.

Figure 13B:
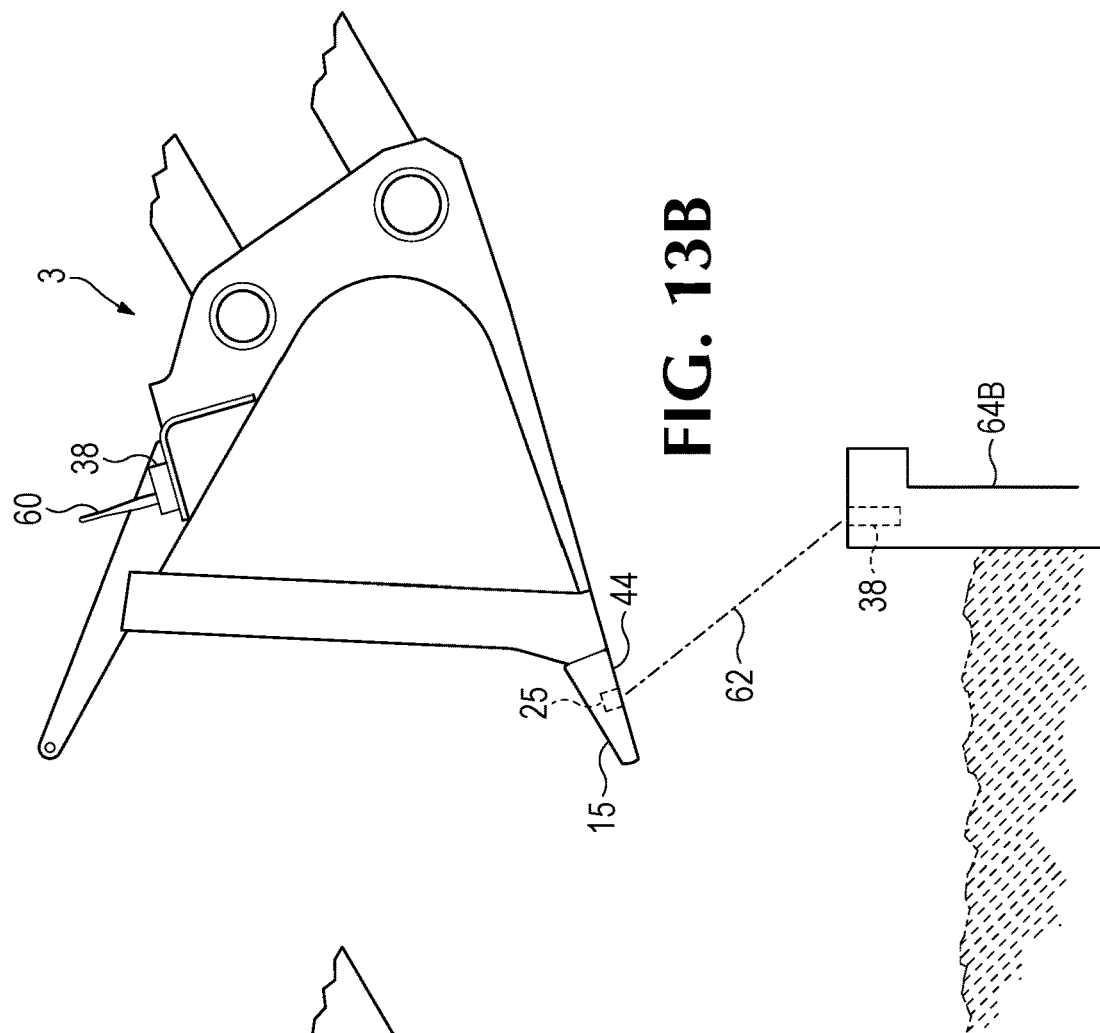
FIG. 13B is a side view of a bucket of a front loader and a portion of a material receptacle.
Figure 13A:
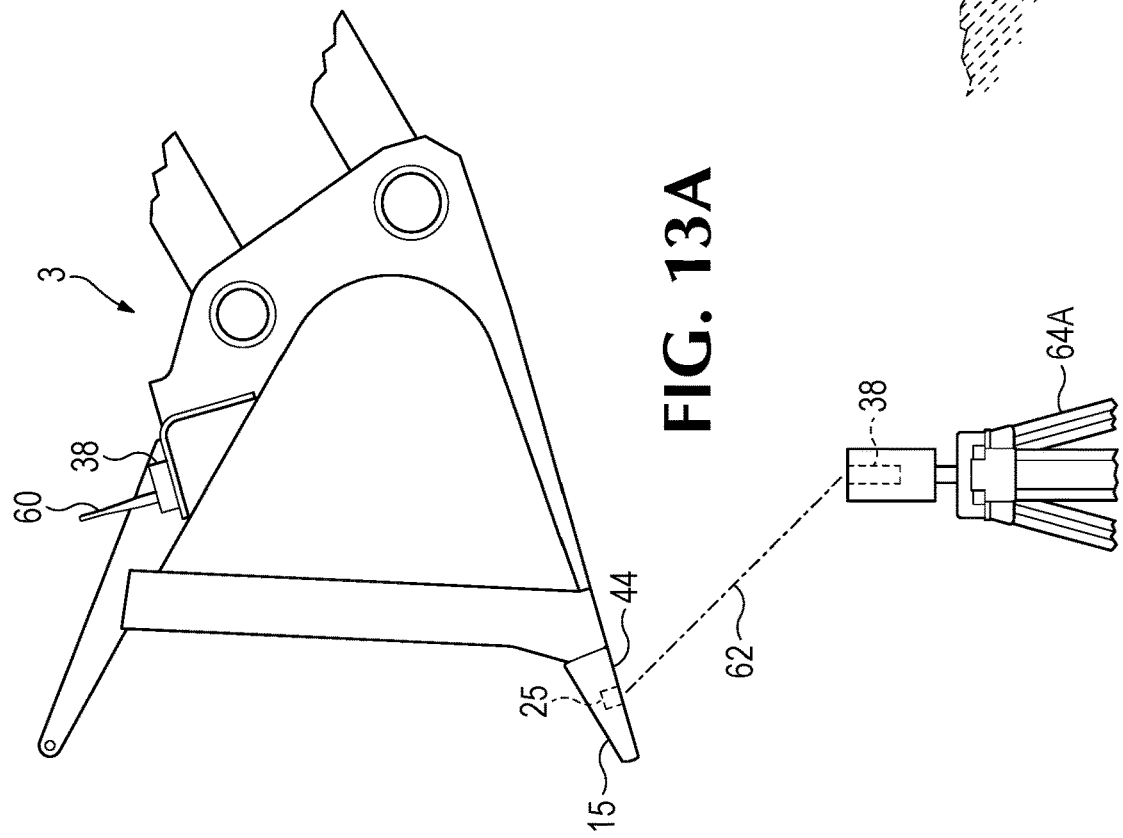
FIG. 13A is a side view of a bucket of a front loader and standalone device to pick up a signal from a sensor

In one other embodiment, a monitoring device 25 is located in a recess in a bottom surface 44 of a tip 15 for a bucket 3 on earth working equipment such as a wheel loader. A remote device 38 may be located on, for example, a standalone stanchion 64A (FIG. 13A) or an edge of a crusher hopper 64B (FIG. 13B) (or other receptacle) to pick up a signal from the monitoring device. FIG. 13B shows the bucket 3 having just dumped a load of material into the hopper 64B. In doing so, the product 15 with a monitoring device 25 passes over remote device 38 in the hopper 64B in wireless communication with the remote device. The remote device 38 on the stanchion 64A or the hopper 64B, or the like can be in addition to, or in lieu of, one or more remote devices located on the earth working equipment, service truck, etc. Remote devices 38 can be in other locations as well. For example, a remote device(s) could be on a stanchion, or threshold device, through which haul trucks pass to detect when a separated ground engaging product is within the bed of material carried in the truck tray. As another example, a remote device could be provided on a truck tray to monitor when the bucket dumps a load into the truck tray (like as disclosed for hopper 64B). The device 25 may also provide data that is subject to real-time processing to assist, e.g., in efficient loading of a truck tray. For example, the system may provide information to the operator on the load to gather (e.g., half a bucket) to completely fill the awaiting haul truck. The device 25 can work in harmony with additional devices configured in accordance with the disclosure, and/or with other machine based sensors including, but not limited to, inclinometers, hydraulic pressure sensors, etc.

In this way various characteristics (e.g., wear) can be monitored in a plurality of ways to improve reliability, though multiple remote devices is not necessary. Providing truck tray 64 with a remote device 38 may also permit other characteristics to be monitored such as time between dumping cycles, number of dumps per truck load, height of bucket above the truck tray edge, etc. Other sensors located, e.g., on the top surface 42 (or other component or the lip) can measure other characteristics such as time to dump the load, the speed at which the material dumps from the bucket, etc. The signals from these sensors may be picked up by a remote device on the machine, on the truck tray or elsewhere.

Various embodiments may locate one or more remote devices 38 at predetermined points on the digging machine 1 and/or other vehicles and pieces of equipment. Various embodiments may provide mobile and handheld devices with remote devices. Embodiments may provide electronic canvassing of the sensors and/or communication devices to inventory the data collected. The data may be combined with previously known data and/or data collected from other locations. One or more programmable logic devices may be utilized to manipulate the data into various machine usable and human usable formats.

Recesses 50 and monitoring devices 25 can similarly be provided in other kinds of ground-engaging ground engaging products such as the lip 5 (FIG. 7A). The monitoring device in the lip can, e.g., identify wear (e.g., with an ultrasonic sensor), impact events, digging cycles, etc. Other similar ground-engaging implements such as blades, bucket sidewalls, etc. could also be provided with similar recesses and monitoring devices.

FIGS. 5B and 6 shows a monitoring device 25 including a sensor 35 in a recess or cavity 220 located at a top rear corner of tooth 15*a*. The monitoring device 25 may be positioned in a bore 220 defined along the rear wall 222 of the tooth (FIG. 14B). In this example, hole 220 has an open channel 228 in rear wall 224 and opens in the top surface 224 of the mounting cavity. The channel 228 being open on one side provides a relatively unobstructed signal path for signals sent to or by monitoring device and/or antenna 36. In this embodiment, hole is closed along its top end, but could be open. The hole is preferably filled with a resin or other material as the body 31. The monitoring device 25 may include a sensor such as a resistor ladder 52 or multi-loop circuit. The monitoring device 25 may be positioned in hole 220 formed into the tooth 15a such as in a casting operation. The hole or hollow may also be formed in other ways, such as by machining. The hollow may extend from the top surface to the cavity 18 but need not. In other cases, the monitoring device may be form fitted over a portion of the tooth or other ground engaging product.

In another embodiment, FIG. 7B illustrates a monitoring device including an extended portion 244 located in a hole 246 configured to wear as the tooth 15 wears. The monitoring device 25 can be secured in recess 242 in various ways including, e.g., a mechanical attachment, welding, resin, etc. As examples, the monitoring device can include a sensor for detecting data regarding a characteristic, a transmitter and/or receiver, a battery, a microprocessor, a storage device and/or a GPS device. A hole may optionally be drilled or otherwise formed forward of recess 242 to receive a sensor (e.g., a resistor ladder) to monitor wear of the point. In this example, the hole extends at least forward of the fully worn condition, though other lengths could be used. The hole can extend toward the front end of the point or be at an angle upward toward the exterior wear surface.

In one other embodiment, monitoring device 25 is provided in a lock 21, such as a lock disclosed in U.S. Pat. No. 9,222,243. The monitoring device 25 can be provided in only the lock or in the lock and one or more recess in the wearable surface 40 of the product 15. In another example, a monitoring device 25 could be secured in each of a pair of locks securing a product such as intermediate adapter 13 in place (FIGS. 16-18).

Returning briefly to FIG. 5, locks 21 are shown in a partially assembled configuration wherein, for each lock 21, a pin 150 is threaded into a collar 122. The collar 122 can be inserted into through-hole 48 in the tip 15 and a pin 150 threaded into the collar to extend into a mating hole 49 in the nose 17 to secure the tip 15 onto the nose 17. The pin 150 could be secured without a collar. Referring now to FIGS. 16-18, the pin 150 includes a head 152 and a threaded shank 154. A recess 50 opens in an outside face 158 of the head 152. The recess 50 includes a main portion 160 and a side portion 162, though other arrangements are possible. The main portion 160 is shaped and adapted to receive a tool (not shown) for turning the pin 150 for installation and removal of the product.

A monitoring device 25 is located within the side portion 162. In one example, device 25 includes a sensor 35 mounted on a substrate 34 such as a printed circuit board. A transmitter 36 and a battery 37 are also mounted on the substrate 34. Other components may be mounted, or coupled with the substrate, such as a logic device. The substrate 34, sensor 35, transmitter 36 and the battery 37 are preferably embedded in a body 31, which in this embodiment is a resin though other arrangements are possible. Another embodiment, not shown may include, a battery 37 provided at or near the inner end or bottom of the recess 50, e.g., beyond the depth needed for electronic device 35 and transmitter 36. In one example, the battery is a ½ AA battery but other kinds of batteries or energy sources can be used. An electronic device 35 is provided in the side portion 162 of the recess. In this embodiment, the chip is the sensor and the transmitter, and the transmitter is, e.g., a radio communication device. In this case also the battery and the chip are preferably embedded in a body 31, which may be a resin. The resin fixes the battery and chip in the recess, protects the components of the monitoring device from earthen material and vibration, and overlies the battery to shield the battery from insertion of a tool to adjust the lock between hold and release positions. The battery and the chip could be provided in separate recesses. The recess or multiple recesses could be unique for the monitoring device and not have a dual purpose such as receiving a tool. One or more chips or other electronic devices could be provided in the recess. A wire or other arrangement extend through the body to electronically connect the chip to the battery. Other arrangements are possible. The one or more electronic device 35 is provided to monitor characteristics such as part ID, presence, condition, usage and/or performance of the ground engaging product to which it is attached.

Locks 21 are generally positioned along the exterior of a product to be accessible by an operator for movement between its hold and release positions, which may be different positions while secured to the product, or may be inserted and removed positions. By providing the monitoring device 25 in (or on) the lock 21, rather than within the mounting cavity of the product, signal blockage caused by the steel (or other material) of the ground engaging product is reduced. A stronger, more reliable signal(s) from the monitoring device(s) reduces the risk of losing the signal(s) or receiving false reads, and provides more flexibility in the positioning of the remote device. Nevertheless, monitoring devices 25 secured to locks could be positioned within the mounting cavity 18 when monitoring conditions, e.g., of cavity wear or relative movement between the product and the base.

In another embodiment, a monitoring device 25 is secured to a lock 21 with or in the form of a plug 75 (FIGS. 5, 21-25). In this example, plug 75 is received into recess 50 to resist entry of earthen fines into the recess 50 in lock 21 during use of the earth working equipment. In another example, the plug can cover the entire opening receiving the lock to provide protection against the entry of fines in the opening. A plug with a monitoring device can be in lieu of or in addition to the monitoring device in side portion 162 of the recess in the pin. Plug 75 can be removed when a tool (e.g., for removal of the product 15) needs to be inserted into recess 50. In this embodiment, at least one monitoring device 25 is secured to, or within, a plug body 76. In the illustrated embodiment, the plug member 75 is the body for the monitoring device 25. In other embodiments, monitoring device 25 may, e.g., be encased in a body that is then secured to the plug body 76. A plug 75 of this kind could also be secured into a recess 50 defined directly into an external surface 40 of product 15.

Figure 22:
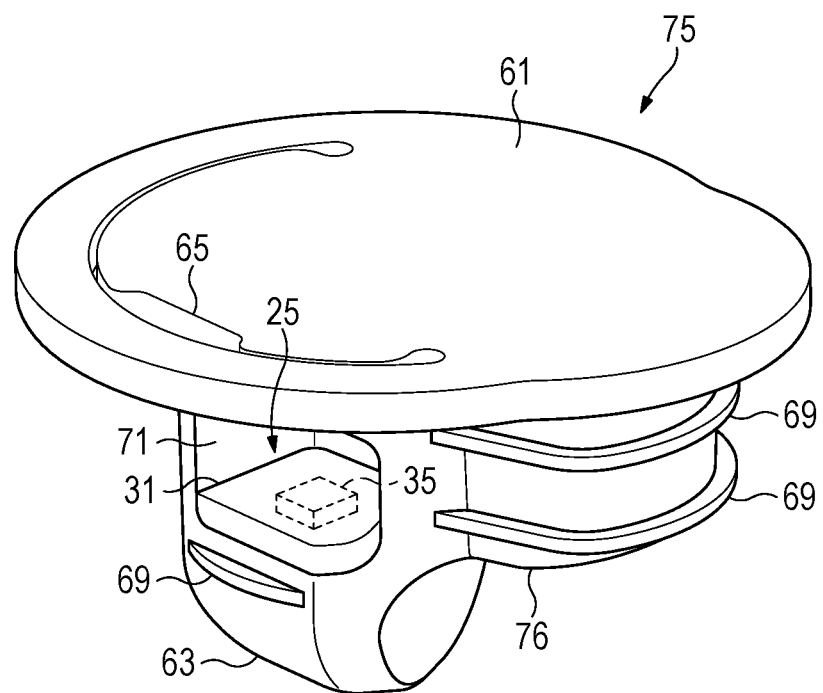
FIG. 22 is a top perspective view of the fines plug shown in FIG. 21.
Figure 23:
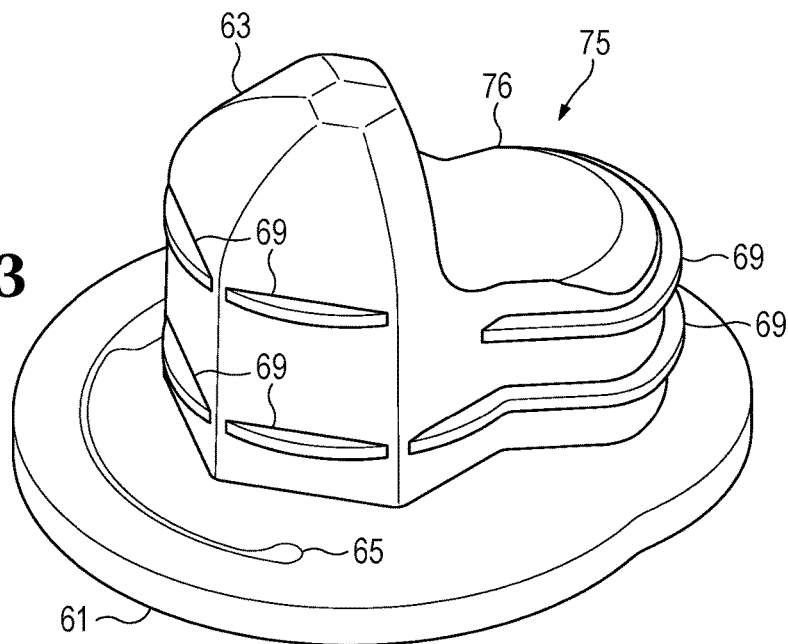
FIG. 23 is a bottom perspective view of the fines plug shown in FIG. 21.
Figure 24:
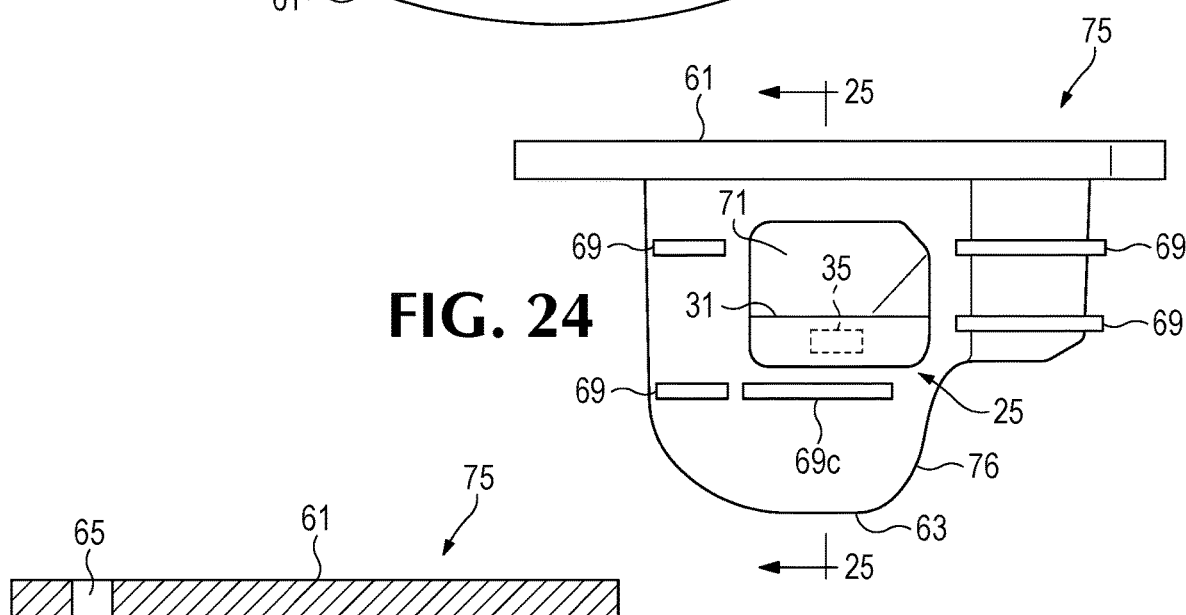
FIG. 24 is a side view of the fines plug shown in FIG. 21.

The monitoring device(s) 25 or sensor(s) 35 are preferably embedded in the body 76 but could be secured in other ways. In one embodiment, only one device 35 is embedded within body 76 (FIG. 22). In an alternative embodiment, more than one device 25 is embedded within the body. Each device 25 may be embedded in a bottom end 63 of body 76 to minimize the impact on performance and from the environment in which the device 25 is used.

Body 76 is a removable member that may be inserted and removed from recesses within the product 7, though it could be fixed if received in a recess that did not receive a tool. Securing the device 25 to a body 76 that is removable allows the device 25 to be temporarily installed in a product 15 or lock 21 (e.g., the device 25 may be used with multiple products 15 during the life of the device 25). Body 76 is preferably made of a polymer though other materials can be used. In one preferred embodiment, the polymer is selected from a group consisting of elastomers, thermoplastics, and thermosets. In one embodiment, the body 76 is an elastomer. The elastomeric body may also be one part of a plug that may consist of parts composed of other materials.

In the illustrated embodiments, the plug 75 has a top end 61 and a bottom end 63 (FIGS. 22-25). Bottom end 63 is preferably shaped to generally match the shape of recess 50A. This minimizes that amount of fines that may be introduced into the recess when the product 15 is used. It should be appreciated that recess 50 may have a variety of shapes and bottom end 63 may have a variety of shapes to generally correspond to the shapes of the recesses. In alternative embodiments, the body 76 may have a shape that is varied from the shape of the recess in which it is received. Inserting plug 75 into a recess of the lock works to mitigate the collection of fines in the lock opening for easier release of the lock in addition to the plug also functioning as a monitoring device. Plug 75 could be inserted into other recesses having other specific purposes, or provided for the sole purpose of receiving plug 75 in the lock or product.

In the illustrated embodiment, the bottom end 63 has one or more retainers 69 to hold the body 76 within the recess 50. In FIGS. 22-25, the retainers 69 are shown as ribs that generally extend around the sides of the outer edges of the bottom end 63. The body 76 is secured within the recess 50 via an interference fit so that the ribs of retainers 69 contact the sides of the recess to secure the body 76 within the recess 50. Other retainers are possible and the ribs are only one example of a retainer that may be used to secure the body within the recess. Other ways of securing the body within the recess 50 are possible. For example, the retainer 69 may be a series of helical ridges that correspond to grooves in the recess. The body 76 may be rotated so that the retainer 69 engages the corresponding grooves in the recess. Alternatively, as an example, one or more latches could be used to secure the plug 75 in place. Further, retainers could be formed in the recess instead of or in addition to retainers on the plug 75.

Bottom end 63 preferably has a removal feature 71 to remove the plug 75 from the recess 50. In the embodiment illustrated in FIGS. 21-22, a removal tool engages removal feature 71 to pry the body 76 out of the recess. The removal tool, for example, may be a pry bar or another tool capable of prying the body out of the recess. Other removal features are possible and the body may be rotated, pivoted or otherwise removed from the recess in which it is received. In alternative embodiments, the body may be removed with a removal feature located outside of the bottom end. In this embodiment the removal feature 71 is configured as a cavity having a bottom portion sized and located to receive and house the monitoring device 25, including a sensor, and other components. The device 25 and other components may be embedded in body 31, for example a resin.

In the illustrated embodiments, the top end 61 is shown as being wider than the bottom end 63 and defining a cap or top flange. A top end 61 that is wider than the bottom end 63 may minimize fines collecting between the body and the recess. In alterative embodiments, the top end may have a width that generally matches the width of the bottom end or may have a width that is smaller than the bottom end. Top end 61 is generally planar and has a generally circular shape; other shapes are possible.

Figure 21:
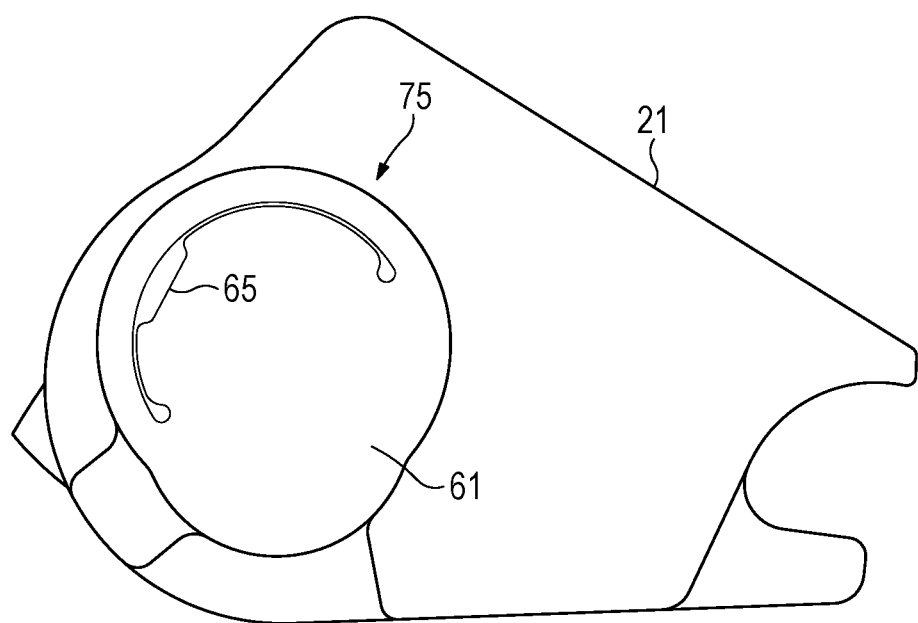
FIG. 21 is a top view of a fines plug with a monitoring device.
Figure 25:
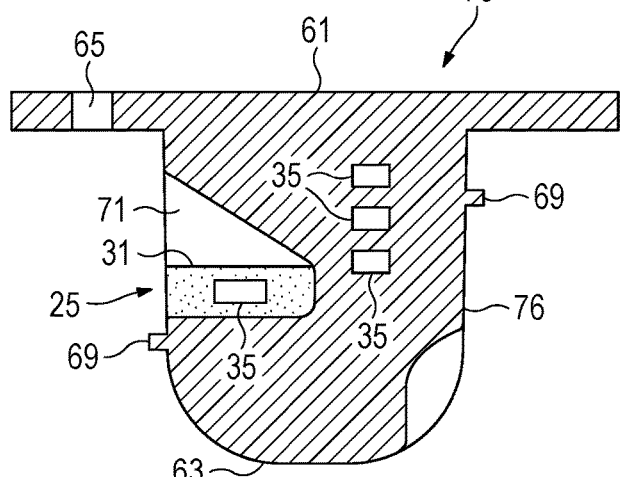
FIG. 25 is a sectional view of the fines plug taken along line 25-25 in FIG. 21.

In the embodiment illustrated in FIGS. 21, 21, and 25, top end 61 has a removal feature 65 that may be used by an operator to pull or pry the body 31A out of the recess. The operator may manually grab the removal feature 65 with one or both hands or may use a tool to engage the removal feature 65. In the illustrated embodiment, the removal feature 65 is shown as a tab that is flush with the top surface 61 of the body, though other configurations are possible. The removal feature 65 may be engaged and moved in an outward direction away from the recess so that the removal feature 65 is above the top surface 61 of the body. The removal feature 65 may be used to initially effect movement of the body out of the recess, and removal feature 71 may be used to completely remove the body 76 from the recess. In alternative embodiments, the removal feature 65 may be used to completely remove the body from the recess. In alterative embodiments, the top end 61 may not have a removal feature 65 or an alternative removal feature may be used to remove the body from the recess 50. For example, the top end 61 may have a removal feature (not shown) in the form of a recess or protrusion that is designed to be engaged with a tool. The tool may engage the removal feature to rotate the body out of the recess 50.

As noted above, the recess for receiving plug 75 (i.e., the monitoring device) may be a recess 50 in a product 15, a recess 162 in a lock 21, a portion of a recess 71 in a plug 75, or a recess 51 in the base 13 (FIG. 5). The recesses may be pre-established for other reasons and not be specifically designed for receiving the monitoring device. For example, the recess may be a recess in a lock that is designed to receive a removal tool to adjust the lock during installation and removal of the product 15. When the product is not being removed or installed, the recess may be used to receive the monitoring device in the form of plug 75. When the lock 21 needs to be adjusted, the plug 75 may be removed from the recess 50.

In alternative embodiments, the recess may be a recess 50 specifically designed for receiving a plug having the configuration of plug 75 (FIG. 7A) or another configuration. The recess may have a variety of shapes. Preferably, the recess has a shape that generally corresponds to body of the plug, although other configurations are possible. The recess 50 is preferably located in or adjacent an exterior surface 40 of the ground engaging product in which it is received so that signal blockage due to the metal of the ground engaging product is reduced. In some embodiments, the recess specifically designed for receiving the plug may be located, e.g., in a lock, a point, an intermediate adapter, an adapter, a nose of a cast lip, a shroud, a lip, a blade, a wear runner, a truck liner, bucket or other ground engaging product of other kinds of earth working equipment. In addition, the recesses can be located where the body will experience minimal wear. In alternative embodiments, the body may be placed in a location that is known to experience wear so that the monitoring device experiences wear and the monitoring device may detect the wear of the product 15.

Figure 19:
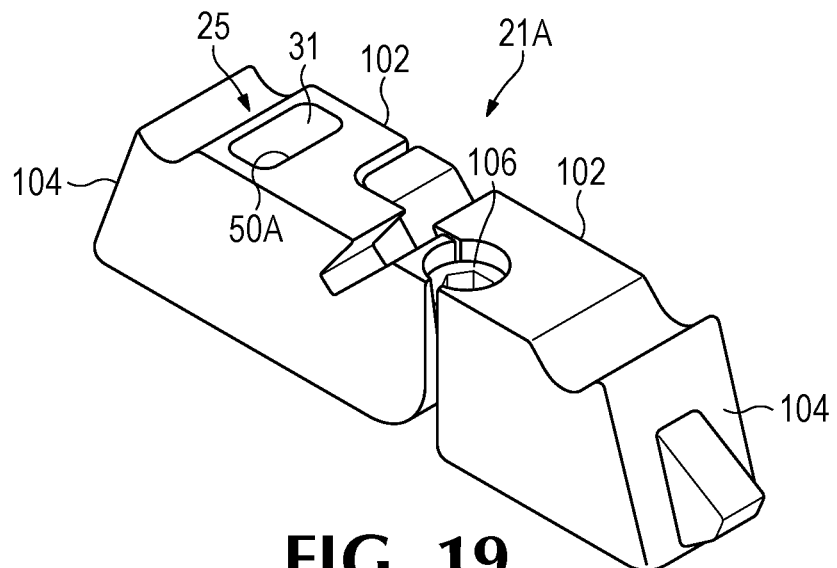
FIG. 19 is a perspective view of an alternative lock.
Figure 20:
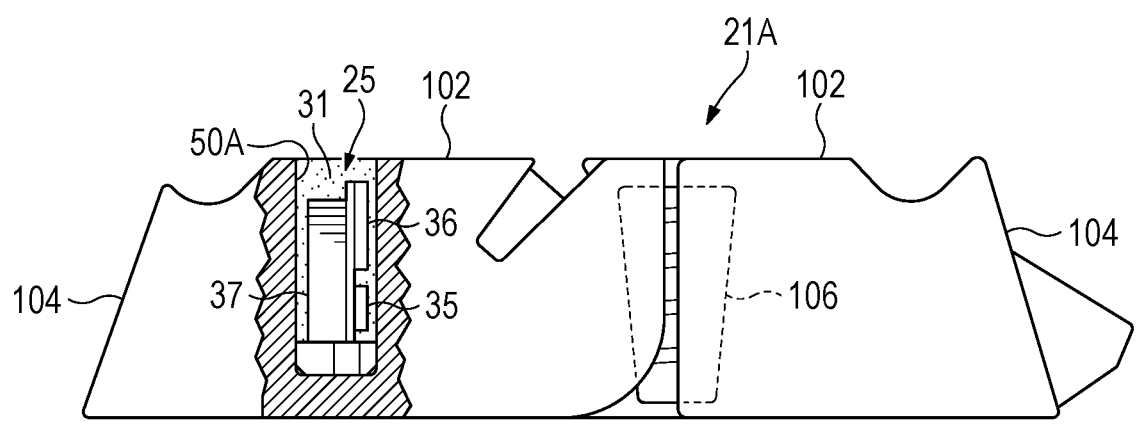
FIG. 20 is a side view of the alternative lock with a monitoring device.

In another embodiment, as a second lock-style example, monitoring device 25 is retained in a lock 21A such as disclosed in U.S. Pat. No. 7,536,811, which is herein incorporated by reference in its entirety. Lock 21A includes a pair of lock bodies 102 pivotally joined together (FIGS. 19-20). Briefly, the lock bodies 102 pivot such that their outer ends 104 move toward each other so the lock can be inserted into the inlet of an opening in a product such as a shroud 9. The lock expands to a linear position when in the opening so the lock is longer than the inlet of the opening. A tapered, threaded retainer 106 is installed at the seam between the bodies 102 to prevent relative movement of the bodies 102 when the lock is inserted in the opening to prevent removal of the lock from the opening of the product. At least one of the lock bodies 102 includes a recess 50A. In one embodiment, monitoring device 25 includes an electronic device, such as sensor 35, and a battery 37 in the recess 50B. A body 31 encapsulates a chip (acting as the sensor and the transmitter) and battery to protect them. Body 31 can be a resin or other material. The monitoring device 25 could be secured and/or protected in the recess 50A in other ways. In one embodiment the monitoring device 25 is disposed in the threaded retainer 106.

In a digging operation, the ground engaging product experiences loading and impact from various directions, and in a wide range of severity and duration. The lock securing the product is affected by the various loads through stresses, movement, vibration, jostling, etc. that can be detected and monitored by the monitoring device. Through this process, the monitoring device and/or remote device can determine, e.g., the condition of the ground engaging product when the gathered information is processed by programmable logic, e.g., in consideration of the type of ground engaging product, the kind of earthen material (e.g., abrasiveness, hardness, etc.), the earth working machine etc. to determine the anticipated useful life of the ground engaging product (and/or base). When coupled with information concerning operation of the machine, and/or worksite, an anticipated replacement date can be determined to permit efficient planning for ground engaging product replacement. The monitoring device can, for example, be used to detect the number of passes of the bucket through earthen material. The monitoring device can also be used to detect the loads, stresses, duration of loading, etc. in the ground-engaging product to determine, for example, penetrability and digging rate. The monitoring device can also be used to determine the presence or absence of a product on the earth working equipment.

The monitoring device 25 can also be provided outside the primary wearable exterior surface 40 of the ground engaging product. In one embodiment, a monitoring device can be in the form of a lifting eye 22 (FIGS. 5-6, 28-31). Due to the size and weight, the larger ground engaging products may have a lifting eye 22 to connect the ground engaging product to a lifting device in order to maneuver the ground engaging product from one place to another. These lifting eyes 22 may be an integral part of the ground engaging product formed during the manufacturing of the ground engaging product (FIG. 5) or may be mechanically separable from the ground engaging products, as disclosed in US Patent Publication 2015/0013134, which is incorporated herein by reference in its entirety. FIGS. 26 and 27 are cross-section views showing a handling plug 250 fitted into a collar 252 fastened into a hole in a shroud 9. A lifting eye (discussed below) may be removed from the collar 252 after it is no longer needed to lift the shroud 9, whereupon the handling plug 250 may be installed. The handling plug 250 may include a sensor 35 in accordance with the disclosure.

Figure 28:
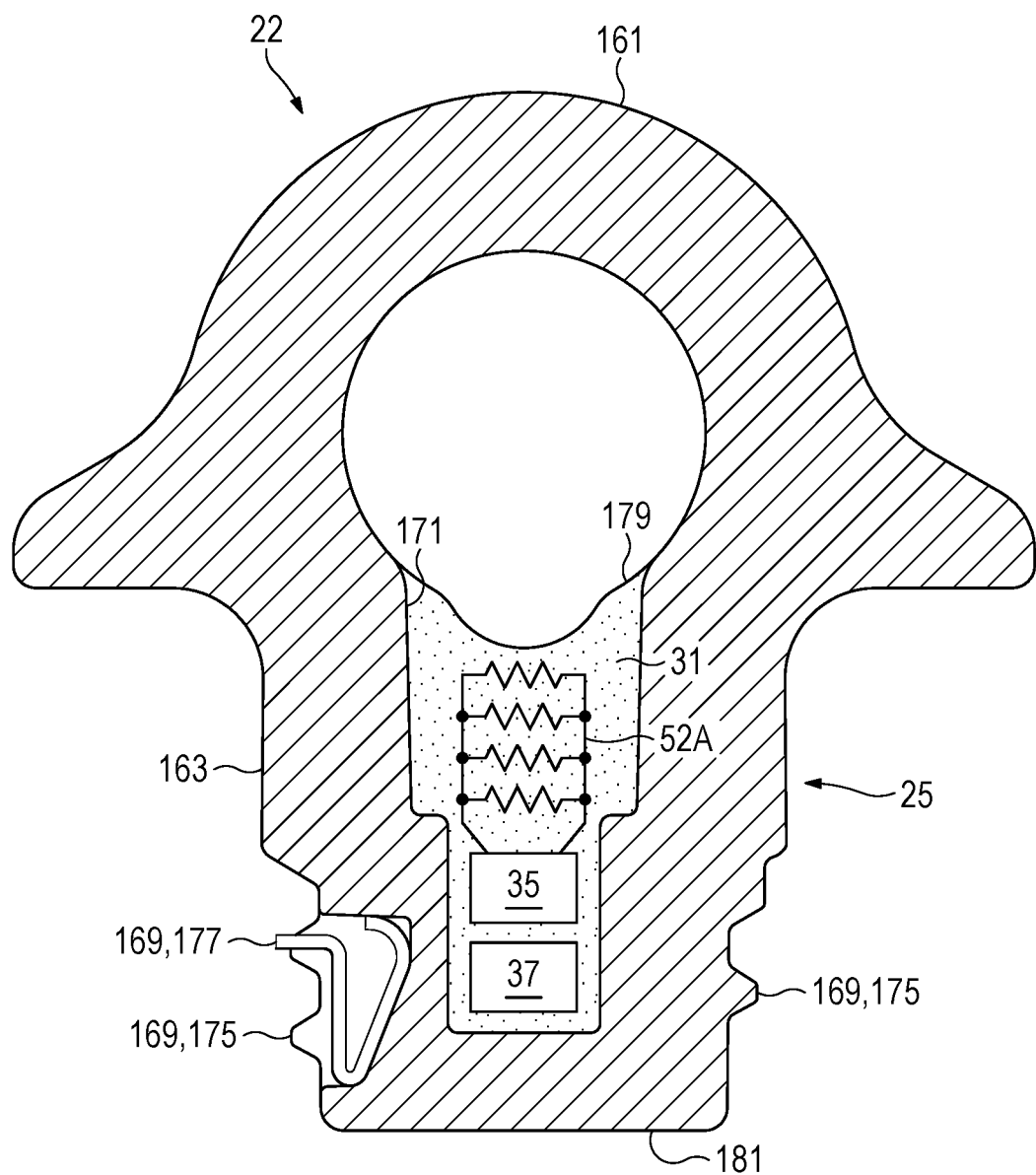
FIG. 28 is a sectional view of a lifting eye with a wear monitoring device.
Figure 29:
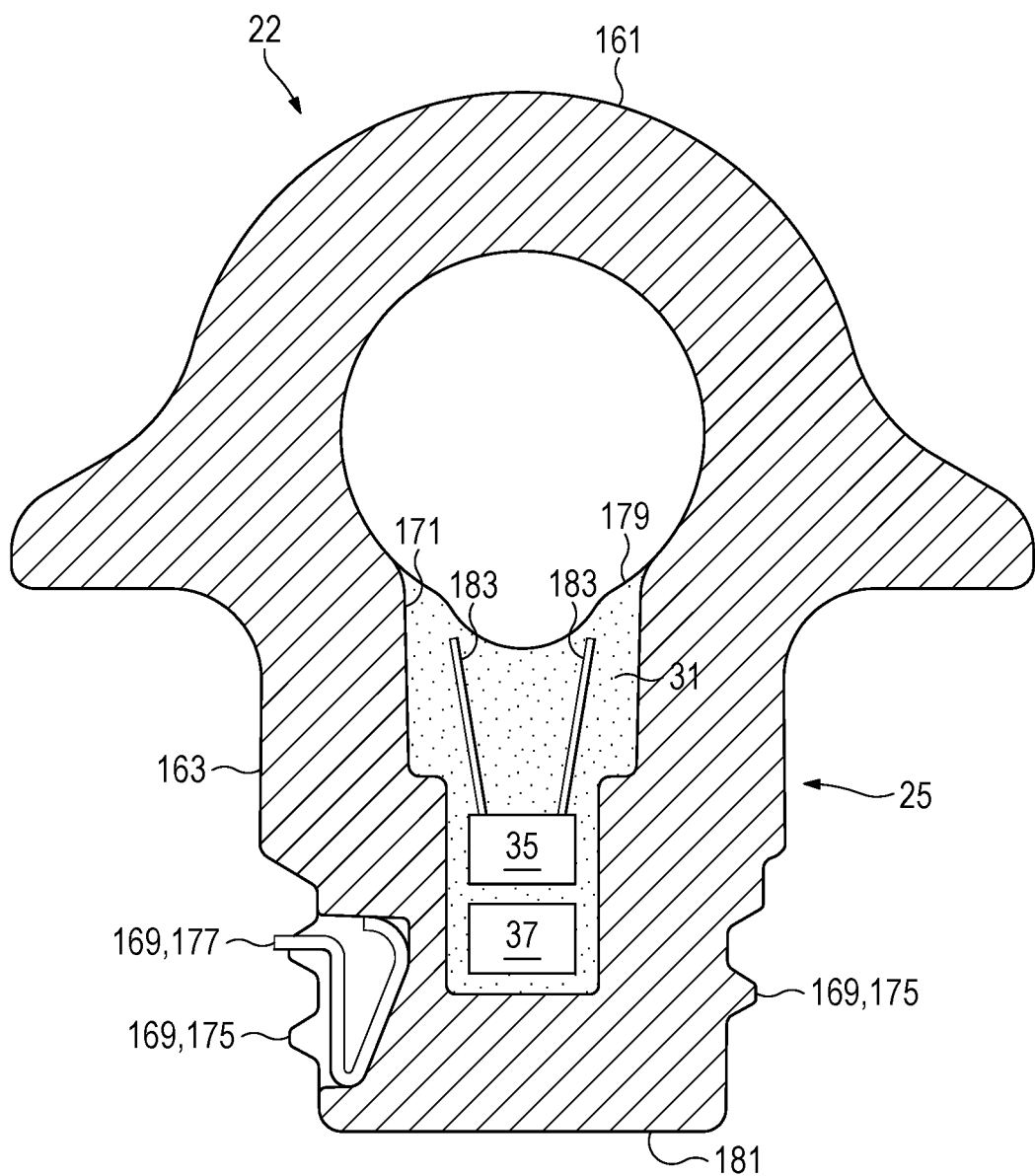
FIG. 29 is a sectional view of another lifting eye with a monitoring device.

In the illustrated embodiment, the monitoring device 25 includes a lifting eye 22 in which is secured a monitoring device 25 including a plurality of devices or sensors 35 (FIGS. 28-29). The devices or sensors 35 are embedded in the mounting portion of the lifting eye 22 but could be secured in other ways and to other portions of the lifting eye device. In one embodiment, only one device 35 is embedded within lifting eye 22. The electronic device 35 is, in this example, embedded in a mounting end 163 of a mechanically separable lifting eye 22 to minimize the effects of the environment in which the device 25 is used. In alternative embodiments, the device may be secured to a lifting eye that is cast or otherwise manufactured as part of the ground engaging product and/or may be secured to the working end 161 of the lifting eye 22 that is used for maneuvering the ground engaging product. The lifting eye 22 can form the body 31 for monitoring device 25, or the monitoring device 25 can be encapsulated in a body that is, in turn, secured in the lifting eye 22.

Lifting eye 22 is similar to the lifting eyes disclosed in US Patent Publication 2015/0013134. Other shapes are possible. In this embodiment, the lifting eye 22 is removable such that the lifting eye may be inserted and removed from holes within the product 7. The lifting eye 22 is mechanically secured and mechanically separable from the ground engaging product. Securing device 25 to a lifting eye 22 that is removable allows the monitoring device 25 to be temporarily installed in a replaceable product 15. In addition, the lifting eye 22 can be used with a variety of different types of ground engaging products with minimal modification to existing ground engaging products (e.g., the ground engaging products can be manufactured or retrofitted with an additional recess or hole to receive the lifting eye or may utilize an existing recess or hole to receive the lifting eye). In alternative embodiments, the device 25 and/or lifting eye 22 may be permanently secured to the ground engaging product and may not be removable.

In one example, the lifting eye 22 of device 25 is secured within a recess or hole 133 in the ground-engaging product 15 (as discussed below). In the illustrated embodiments, the lifting eye 22 has a working end 161 for engaging lifting devices and a mounting end 163 to secure the lifting eye to the product (FIGS. 28-31). As disclosed in US Patent Publication 2015/0013134, a collar (not shown) may be provided with an opening to receive the mounting end 163 of the lifting eye. The collar may be a part of the lifting eye 22 or may be a part of the product 15. In alternative embodiments, the collar may be omitted and the lifting eye 22 may directly engage other features of the product 15 to secure the lifting eye 22 to the product 15.

Mounting end 163 is preferably shaped to generally match the shape of hole 133 or the opening within collar. This minimizes the amount of fines that may be introduced into hole 133 or opening when the product 15 engages the ground to be excavated. It should be appreciated that hole 133 and/or opening may have a variety of shapes and mounting end 163 may have a variety of shapes to generally correspond to the shapes of the hole 133 or opening. In alternative embodiments, the lifting eye 22 may have a shape that is varied from the shape of the hole or opening in which it is received.

Inserting sensors 35 into a recess 171 of the lifting eye permits the device 25 to function as a tool for maneuvering the product in addition to its monitoring functions. Nevertheless, sensors 35 could be inserted into other recesses, holes, or openings having other specific purposes or provided for the sole purpose of receiving monitoring device 25 in the ground engaging product.

The mounting end 163 preferably has one or more retainers 169 to hold the lifting eye 22 within the hole 133 or 166. In the embodiment illustrated in FIGS. 28-29, the retainers 169 are shown as helical ridges 175 in the form of threads. As described in US Patent Publication 2015/0013134, the threads generally extend around the sides of the outer edges of the mounting end 163. The lifting eye 22 is preferably secured within the hole 133 or opening with the threads 175. Other securement mechanisms and retainers are possible and the helical ridges are only one example of a retainer that may be used to secure the lifting eye 22 within the hole 133 or opening 166. Other ways of securing the lifting eye 22 within the hole 133 or opening 166 are possible. For example, one or more latches could be used to secure the lifting eye in place.

In the illustrated embodiment, the lifting eye is further provided with a retainer 169 in the form of a latching detent 177. The latching detent 177, preferably, enables lifting eye 22 to stop at a fixed position with a predetermined orientation relative to collar or hole 133. Further, the latching detent 177 maintains the lifting eye 22 in a preferred orientation so that if the ground engaging product spins while secured to the lifting device the latching detent 177 of lifting eye 22 ensures that the ground engaging product does not rotate relative to the lifting eye or otherwise become separated from the lifting eye 22 (i.e., the latching detent 177 prevents the lifting eye 22 from rotating further into or out of the collar as the ground engaging product is lifted with the lifting device). Latching detent 177, preferably, keeps lifting eye 22 outside of hole 133 or opening with sufficient clearance, so that the ground engaging product can be removed (and installed). Other kinds of latching formations could be used that latch in other ways such as to engage the inner wall of the product cavity or the lifting eye may not be provided with a latching formation.

Mounting end 163 preferably has a recess 171 for receiving monitoring device 25. Recess 171 preferably extends from an exterior surface 179 of the mounting end 163 that is adjacent the working end 161 to a depth short of an opposing exterior surface 181. In alternative embodiments not shown, the recess may, for example, extend from an exterior surface in the mounting end that is opposite the working end to a depth short of an exterior surface adjacent the working end or the recess may extend through the entire mounting end of the lifting eye. The recess 171 may have a width that is the same through its length or may have a width that is varied as it extends into the mounting end 163 of the lifting eye 22.

One or more devices 25 may be secured within recess 171 of lifting eye 22. There are multiple ways to secure the devices 25 within recess 171. For example, the devices 25 may be mechanically secured within recess 171 or an adhesive may be used to secure the device within the recess 171. In alternative embodiments, the devices 25 may be secured to, or embedded in, a polymer that is secured within the recess 171.

In the embodiment illustrated in FIG. 29, an antenna 183 extends from the device 35 to an exterior surface 179 of the mounting end 163 that is adjacent the working end 161 of the lifting eye 22. In alternative embodiments, the antenna may extend to a point shy of the exterior surface 179. With this arrangement there is minimal signal blockage from the metal of the ground engaging product. The antenna 183 is preferably wearable to function as a wear monitoring device. As the ground engaging product engages the ground the lifting eye 22 wears and the antenna 183 wears to provide an indication of the wear that the ground engaging product has experienced. In an alternative embodiment illustrated in FIG. 28, the electrical devices 35 are in the form of a wearable resistor ladder 52A. As the resistor ladder 52A wears, the resistance changes providing an indication of the degree of wear that the ground engaging product has experienced. In alternative embodiments, the devices may be free of an antenna or may have an antenna that does not extend generally in the direction of the exterior surface.

Recess 171 may be filled in with a polymer once the monitoring device(s) 25 has been secured within the recess 171. In one embodiment, the polymer is selected from a group consisting of elastomers, thermoplastics, and thermosets. In alternative embodiments, the recess 171 may be filled in with a material other than polymers or may not be filled in. Securing the devices 25 to a polymer and/or filling the recess 171 with a polymer may further protect the devices 35 from fines as the ground engaging product engages the material to be excavated.

In the illustrated embodiments, the working end 161 is shown as being a load bearing ring. Other types of working ends are possible. For example, the ring could be replaced with other rigging engaging elements such as a plate with a hole, a c-shaped loop with a spring loaded gate, a threaded socket, or an adapter that can be gripped by or otherwise secured to the lifting device. In this application, lifting devices with any of these arrangements are referred to as a lifting eye even if the working end does not include a traditional "eye."

Figure 30:
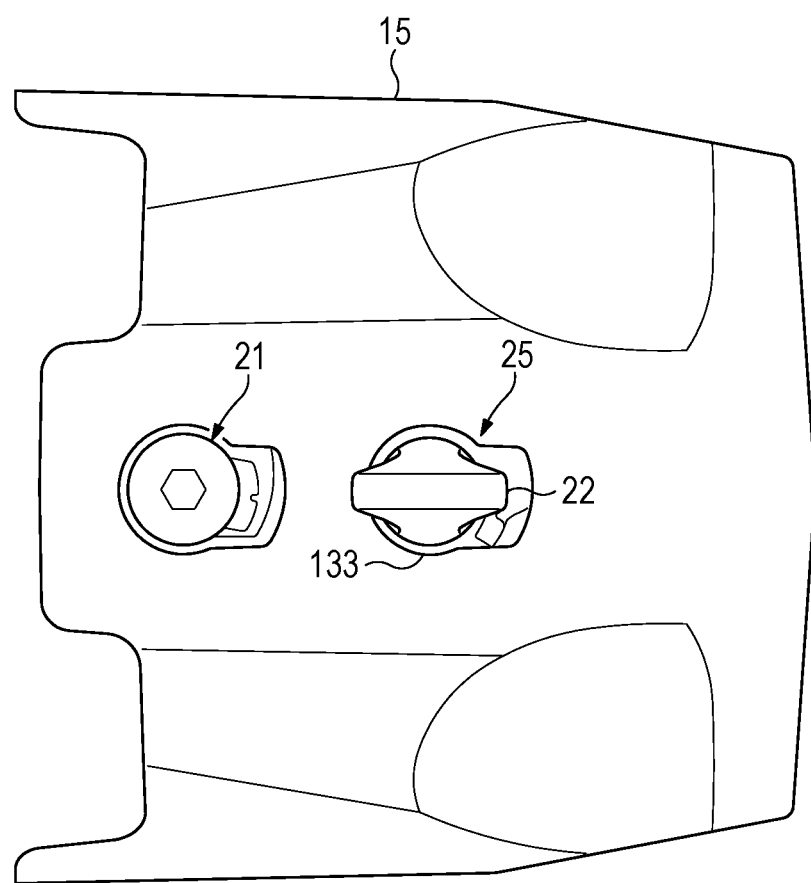
FIG. 30 is a top view of a tip with the lifting eye of FIG. 28.
Figure 31:
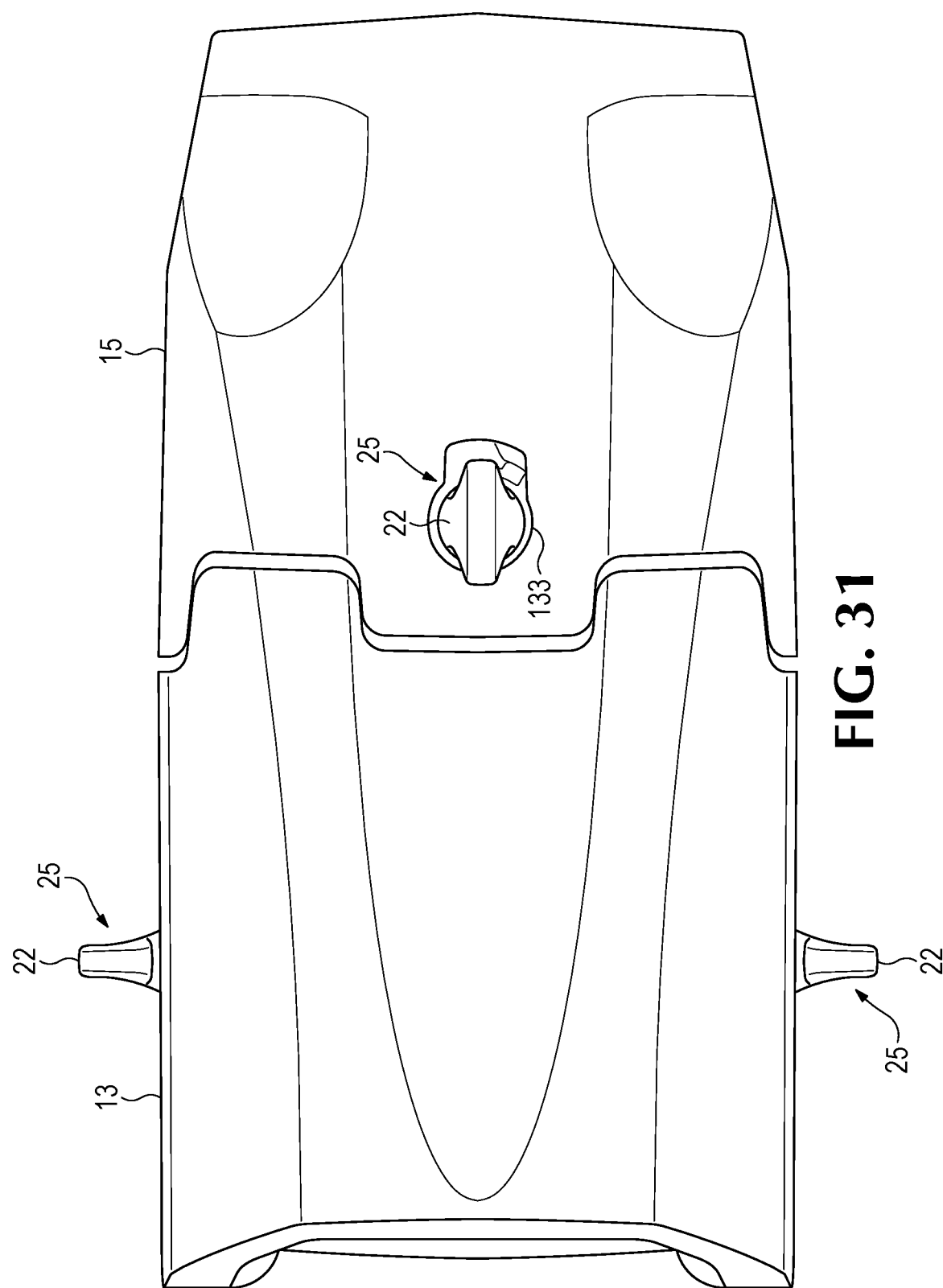
FIG. 31 is a top view of a tip and adapter with lifting eyes of FIG. 28 attached.

The hole for receiving lifting eye 22 may be pre-established for other reasons and not be specifically designed for receiving the lifting eye 22. For example, the hole may be a hole 133 that is normally used for receiving a lock 21 to secure the product to the base (FIG. 30). In other embodiments, the hole 133 may be specifically designed for receiving the lifting eye 22 (FIG. 30). In some embodiments, the hole specifically designed for receiving the monitoring device 25 may be located in a point, an intermediate adapter, an adapter, a nose of a cast lip, a shroud, a lip, a blade, a wear runner, a truck liner, or other products of other kinds of earth working equipment. In addition, the holes 133 are preferably placed in a location that is known to experience wear so that the lifting eye 22 experiences wear and the electronic device 35 may detect the wear of the product 15 and/or the lifting eye 22.

Monitoring device 25 may comprise more than one lifting eye 22, i.e., multiple lifting eyes 22 and multiple devices 25 may be used together to monitor multiple ground engaging products. For example, a bucket 3 may have multiple ground-engaging products 7 and at least one lifting eye 22 with at least one device 25 installed in each product 7 so that the programmable logic receives the information from the multiple devises 25 and process the data from each device 25 to identify and determine the condition and health of each product 7. Alternatively, multiple devices 25 may be secured to a single product. As one example, a device 25 could be secured to the product and another device 25 secured to the base (FIG. 5). As another example, a plurality of devices 25 could be secured to the ground engaging product.

For all the embodiments, the monitoring device 25 and/or remote device 38 can use programmable logic to process information generated from, e.g., devices 25 and/or the remote devices 38 for identifying characteristics such as the part ID, presence, condition, usage and/or performance of the ground engaging product being monitored and/or providing alerts to the operator. Processors (e.g., microprocessors), using programmable logic may be part of monitoring device 25 and/or a remote device 38. The programmable logic included in a remote device may, for example, use information received from monitoring device 25 to identify that the product 15 is still secured to the base 13. When the product has unexpectedly been separated from the base 13, the monitoring device 25 may send a different signal indicating a change in the condition of the product 15. In another example, the processor may use information about the geology of the mine site in combination with the wear information from monitoring device 25 to determine, e.g., the estimated wear life remaining for the product. In another example, the programmable logic may use the number of digging cycles or the duration that a ground engaging product has been in service to determine the estimated wear life remaining. The programmable logic may be programed to produce a precautionary alert that a specific product is close to needing replacement. The alert may be, for example, a visual alert, haptic feedback, and/or an audio alert. The devices 25 and/or 38 may wirelessly provide the alerts to equipment operators and/or wireless devises for access by the operator or others such as maintenance personnel, mine site managers or the like. In addition, the programmable logic may be programed to produce an alert if the condition indicates, e.g., that the ground engaging product has been unexpectedly separated from the base, broken, or is at or near a fully worn condition.

The monitoring device 25 and/or remote device 38 may be, for example, passive or active and may include a receiver, transmitter, and/or a digital sensor. The receiver and/or transmitter may be, for example, a radio communication device, an electromagnetic wave receiver and/or transmitter, a mechanical wave receiver and/or transmitter, a laser receiver and/or transmitter, or Global Positioning System (GPS). The electromagnetic waves preferably have a wavelength outside of the visible spectrum (e.g., infrared, microwave, or Radio Frequency [RF]), but may be in the ultrasonic spectrum. Further, the devices 25, device 35 may include a temperature sensor, a camera, a digital inclinometer unit, a digital compass, an RFID, an accelerometer, a timer, a proximity sensor, a force sensor, a position sensor, and/or other sensors that provides information regarding the operating conditions in which the ground engaging product is being used.

The results and alerts from the process may be sent to at least one Human Machine Interface (HMI). The HMI could, e.g., be a handheld device 39 as shown in FIG. 11, mounted in a cab of a vehicle such as a digging machine or haul truck, or in an office location. The features, events, data or the like detected by the monitoring device can be processed with other collected or stored data by programmable logic to determine a wide variety of factors that may influence the mine operator. As an example, the system may determine the anticipated fully worn condition using data on past usage of the equipment, real-time monitoring of the equipment, outside factors such as the hardness or abrasiveness of the earthen material being worked, the material composition of the ground engaging product being monitored, etc. The data may also, as an example, be coordinated with other scheduled maintenance to determine the most efficient time to replace or maintain the product being monitored. In turn, the HMI can on the basis of the detected features and/or processed information provide alerts, data, expected wear lives, and the like for more efficient use of the earth working equipment.

The monitoring device 25 may also communicate with other computer systems, wirelessly or through a cable, the specific ground engaging product(s) needing maintenance either because the ground engaging product is separated or because there is an indication that the ground engaging product may need maintenance. In addition the monitoring device may store all of the results from the process. The HMI may be hard wired to a remote device or may be a wireless device, may be integrated with a display system currently in the excavating equipment (e.g., with the OEM display), integrated with a new display system within the excavating equipment, and/or may be located in a remote location. The HMI may be configured to provide a graphical display of the current condition of the ground engaging product. The HMI may, for example, provide visual alerts (e.g., text and/or pictorial images), haptic feedback (e.g., vibrations), and audio alerts regarding the condition of each ground engaging product. The visual alert may be, for example, a graphical picture displaying each ground engaging product and the condition of each ground engaging product (i.e., absent/present, acceptable wear, needing maintenance). The HMI may be designed to display a live image of the ground engaging product so that an operator can visually check that an alert is valid. The HMI may be designed to display a history chart so that an operator can determine when an alert happened so that an operator can take the necessary actions if a ground engaging product is unexpectedly separated. The HMI may include a display 41. The display 41 may include various visual indicators including but not limited to: photographs of, for example, similar ground engaging products from a database; photographs taken with camera at the worksite, such as with camera 190 on boom 2 (FIG. 12); remaining wear life; bucket configuration; etc.

In use, monitoring device 25 may be installed in recess 50 as a part of the manufacturing process or in the field. When the monitoring device 25 is installed in recess 50 at the time of manufacture, it may also be used to track shipping progress, inventory levels of the products 15, and/or when products are removed from inventory for use. In addition, the monitoring device 25 may be able to detect if the product 15 experienced a condition that has the potential to damage the ground engaging product during shipping. Alternatively, monitoring device 25 may be installed after the manufacturing process and may, for example, be installed in lock 21 (as discussed below) while in inventory or at the time of installation of the a new ground engaging product on the earth working equipment.

In another example, a monitoring device 25 can provide data for a real-time assessment of characteristics of an operation. For example, the tool can monitor the load gathered in a bucket and in the truck tray being filled to provide information to the operator on more efficiently filling the truck tray. As an example, the system may indicate the awaiting haul truck will be completely filled with the bucket being only partially (e.g., half) filled. In this way, the system can increase the efficiency and production of the operation. Real-time assessments can be used in other ways such as to optimize the digging path, schedule maintenance, estimate production, etc.

In another example, a monitoring device 25 can be used to generate data usable to map a mine site or other earth working site to estimate characteristics of the ground-engaging products on earth working equipment used at the site. For example, the gathered data could be used to generate contour-style mapping of wear rates for ground-engaging products to better determine such things as product replacement schedules, costs, etc. In one example, the data gathered by device 25 could be combined with other data such as mine geology, GPS data, fragmentation, etc. The data could be used to map other characteristics or process the site data in ways other than mapping to generate similar information.

In one embodiment, with any of the monitoring devices, each ground-engaging product 15 on lip 5 includes a monitoring device 25. The monitoring devices 25 detect each other in established positions for the equipment on which they are secured. Alternatively (or in addition to), all the monitoring devices are detected by a remote device 38 (or a plurality of remote devices). Loss of a product (e.g., through breakage or pin ejection) results in loss of the monitoring device from the established electronic framework; i.e., a significant change in position of the monitoring device is detected when one monitoring device deviates beyond a certain range of its established position with the other monitoring devices. The range of expected motion caused, e.g., by digging is determined by considering such things as the type of ground engaging product, wear, the operation of the machine, etc. Alternatively, the remote device 38 detects the positions of the monitoring devices 25 to ensure the presence of each product in its established position relative to the other monitoring devices 25. In either case, by detecting the presence of the product through its relative position and orientation with the other products, the system operates irrespective of the movement and operation of the earth working equipment with the ground engaging products.

In one embodiment, a camera could be attached to, e.g., the bucket, boom, stick, machine, drone, service truck, or other support to provide a visual double check for the operator. For example, a camera 190 can be secured to the boom 2 to capture (at least part of the time) a visual image of the ground engaging products attached to the bucket 3. When the machine operator (or another) receives an alert that, e.g., a ground engaging product has separated, a display showing the visual image within the cab can be checked to ensure the noted ground engaging product is actually missing from the bucket. This backup system can reduce false alarms that cause the operator to stop operation of the machine.

In another embodiment, systems involving cameras such as used in prior art systems or as disclosed in U.S. Provisional Patent Applications 62/116,216, and 62/151,124, and the U.S. patent application Ser. No. 15/043,433 claiming priority on these two applications and filed concurrently with this application on Feb. 12, 2016, which is incorporated by reference in its entirety, can be used in combination with the monitoring systems described in this application. The information received from the camera-based systems can be used as a backup double check to reduce the number of false alarms. Alternatively, the monitoring devices disclosed herein could be a backup double check for the camera-based monitoring systems. Further, the data collected by both a camera-based monitoring system and a non-camera based monitoring system (such as disclosed herein) could be collectively processed to determine, e.g., the part ID, presence, usage, condition and/or performance of the ground engaging product. The full data received by both systems could lead to more reliable conclusions and assessments.

The above disclosure describes specific examples products and systems for identifying characteristics such as the part ID, condition, usage, presence and/or performance of a ground engaging product used on earth working equipment. The features in one embodiment can be used with features of another embodiment. The examples given and the combination of features disclosed are not intended to be limiting in the sense that they must be used together.

The invention claimed is:

1. A monitoring system comprising:
a ground-engaging product secured to earth working equipment at a worksite, the ground-engaging product including an exterior surface and an opening, and
a monitoring device secured in the opening and including an electronic device to monitor at least one characteristic of the ground-engaging product, and a communication device to wirelessly transmit data gathered by the electronic device;
at least one remote device to wirelessly receive the data; and
at least one programmable logic device to process the data to determine at least one characteristic associated with ground being worked by the earth working machine.

2. The monitoring system of claim 1 wherein the worksite is a mine.

3. The monitoring system of claim 1 wherein the at least one programmable logic device uses the transmitted data to determine the at least one characteristic at a plurality of locations at the worksite.

4. The monitoring system of claim 1 wherein the at least one characteristic includes the wear rate for the ground-engaging product on account of working the ground at the worksite.

5. The monitoring system of claim 4 wherein the at least one programmable logic device uses the at least one characteristic to determine a replacement schedule for the ground-engaging product.

6. The monitoring system of claim 1 wherein the at least one characteristic includes the penetrability of the ground at the worksite.

7. The monitoring system of claim 1 wherein the at least one programmable logic device determines the digging rate of the earth working machine.

8. The monitoring system of claim 1 wherein the at least one remote device determines timetables for excavating material.

9. The monitoring system of claim 1 including at least one database including worksite information, wherein the at least one programmable logic device uses the worksite information to determine the at least one characteristic.

10. The monitoring system of claim 9 wherein the worksite information includes the geology of the ground at the worksite.

11. The monitoring system of claim 9 wherein the worksite information includes the fragmentation of the ground at the worksite.

12. The monitoring system of claim 9 wherein the worksite information includes the abrasiveness of the ground at the worksite.

13. The monitoring system of claim 9 wherein the worksite information includes the hardness of the ground at the worksite.

14. The monitoring system of claim 1 wherein the at least one programmable logic device uses GPS data to determine the characteristic at the worksite.

15. The monitoring system of claim 1 wherein the monitoring device detects wear in the ground-engaging product.

16. The monitoring system of claim 1 wherein the monitoring device detects impact in the ground-engaging product.

17. The monitoring system of claim 1 wherein the monitoring device detects strain in the ground-engaging product.

18. The monitoring system of claim 1 wherein the monitoring device detects loads applied to the ground-engaging product.

19. The monitoring system of claim 1 wherein the monitoring device detects the duration of loading on the ground-engaging product.

20. The monitoring system of claim 1 wherein the monitoring device detects digging cycles of the earth working machine.

21. The monitoring system of claim 1 wherein the monitoring device detects the number of passes the ground-engaging product makes through the ground.

22. The monitoring system of claim 1 wherein at least one programmable logic device inventories the data collected, and uses the inventoried data to determine the at least one characteristic.

23. The monitoring system of claim 1 wherein the at least one programmable logic device uses information pertaining to the operation of the earth working machine to determine the at least one characteristic.

24. The monitoring system of claim 22 wherein the machine information includes engine torque of the earth working machine.

25. The monitoring system of claim 22 wherein the machine information includes fuel consumption of the earth working machine.

26. The monitoring system of claim 1 wherein the ground-engaging product is secured to a digging edge of a bucket secured to the earth working equipment.

27. The monitoring system of claim 1 wherein the ground-engaging product is a lip of a bucket secured to the earth working equipment.

28. The monitoring system of claim 1 wherein the ground-engaging product is a bucket having walls to define a cavity for gathering earthen material and a digging edge.

29. The monitoring system of claim 26 wherein the monitoring device is secured to one of the walls of the bucket.

30. The monitoring system of any of claim 1 wherein the ground-engaging product is a blade secured to the earth working equipment.

* * * * *